United States Patent
Yuan et al.

(10) Patent No.: US 12,328,678 B2
(45) Date of Patent: Jun. 10, 2025

(54) POWER CONTROL METHOD AND POWER CONTROL APPARATUS

(71) Applicant: HUAWEI TECHNOLOGIES CO., LTD., Guangdong (CN)

(72) Inventors: Shitong Yuan, Chengdu (CN); Fengwei Liu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 18/055,392

(22) Filed: Nov. 14, 2022

(65) Prior Publication Data

US 2023/0076802 A1 Mar. 9, 2023

Related U.S. Application Data

(63) Continuation of application No. PCT/CN2021/093266, filed on May 12, 2021.

(30) Foreign Application Priority Data

May 15, 2020 (CN) .......................... 202010418320.4

(51) Int. Cl.
*H04L 12/14* (2024.01)
*H04W 52/14* (2009.01)

(52) U.S. Cl.
CPC ................................. *H04W 52/143* (2013.01)

(58) Field of Classification Search
CPC .... H04W 52/14; H04W 52/143; H04L 12/14; H04L 41/0803; H04L 41/0896
See application file for complete search history.

(56) References Cited

U.S. PATENT DOCUMENTS

| 7,978,845 B2 * | 7/2011 | Caveney | H04L 43/0811 |
| | | | 379/387.01 |
| 9,332,504 B2 * | 5/2016 | Cheng | H04W 52/34 |
| 10,813,053 B2 * | 10/2020 | Ghosh | H04W 52/245 |
| 11,523,348 B2 * | 12/2022 | Pan | H04W 56/001 |
| 11,800,457 B2 * | 10/2023 | Pan | H04W 52/46 |

(Continued)

FOREIGN PATENT DOCUMENTS

| CN | 110831135 A | 2/2020 |
| CN | 110972211 A | 4/2020 |

OTHER PUBLICATIONS

R1-1813975, ATandT, Summary of 7.2.3.1 Enhancements to support NR backhaul links, 3GPP TSG RAN WG1 Meeting #95, Spokane, USA, Nov. 12-16, 2018, 23 pages.

*Primary Examiner* — Hai V Nguyen

(57) ABSTRACT

Embodiments of this application disclose a power control method and a power control apparatus, to alleviate a transmission capacity decrease caused by interference, and improve transmission performance. The method in embodiments of this application includes: A first node determines a first power control parameter. The first power control parameter is used to indicate first transmit power expected by the first node in a first transmission mode. The first node sends a first message to a second node. The first message carries the first power control parameter, and the first message is used to request the first transmit power expected by the first node in the first transmission mode. The second node is an upper-level node of the first node or a donor base station.

17 Claims, 10 Drawing Sheets

(56) References Cited

U.S. PATENT DOCUMENTS

| | | | |
|---|---|---|---|
| 11,949,553 B2* | 4/2024 | Yuan | H04L 41/0803 |
| 2010/0150172 A1* | 6/2010 | Zalitzky | H04L 47/829 |
| | | | 370/468 |
| 2012/0327794 A1* | 12/2012 | Han | H04W 52/46 |
| | | | 370/252 |
| 2015/0055497 A1* | 2/2015 | Cheng | H04W 52/34 |
| | | | 370/252 |
| 2020/0053655 A1* | 2/2020 | Ghosh | H04W 88/10 |
| 2021/0218620 A1* | 7/2021 | Yuan | H04L 41/0803 |

* cited by examiner

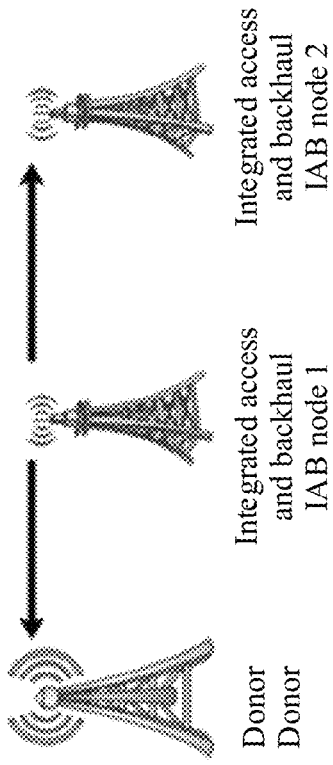
FIG. 2(a) Uplink full-duplex
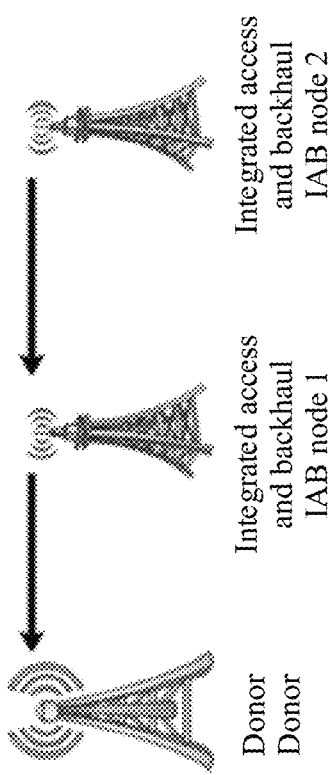
FIG. 2(c) Downlink full-duplex
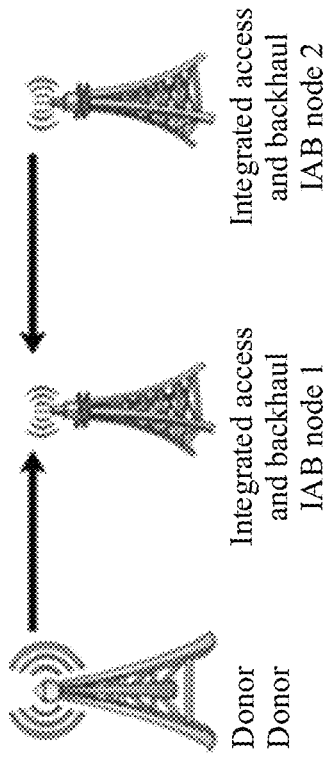
FIG. 2(b) Space-division transmission
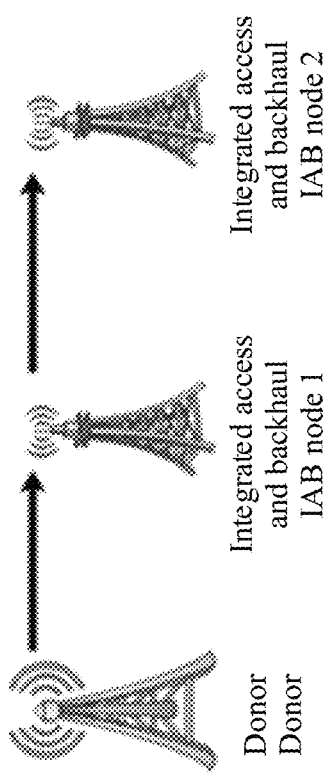
FIG. 2(d) Space-division reception

POWER CONTROL METHOD AND POWER CONTROL APPARATUS

CROSS-REFERENCE TO RELATED APPLICATIONS

This application is a continuation of International Application No. PCT/CN2021/093266, filed on May 12, 2021, which claims priority to Chinese Patent Application No. 202010418320.4, filed on May 15, 2020. The disclosures of the aforementioned applications are hereby incorporated by reference in their entireties.

TECHNICAL FIELD

This application relates to the field of communication technologies, and in particular, to a power control method and a power control apparatus.

BACKGROUND

In a $5^{th}$ generation communication system ($5^{th}$ generation mobile network or $5^{th}$ generation wireless system, 5G), an integrated access and backhaul (integrated access and backhaul, IAB) node is also referred to as an access and backhaul integrated node in some technical scenarios, and is an evolved node in a relay technology. In a wireless communication network, a relay node is usually configured to implement extended coverage or coverage hole coverage, or to improve a system capacity.

Currently, when the IAB node accesses a network, for example, when the IAB node is in a time-division multiplexing transmission mode, the IAB node performs data transmission by using a power control parameter corresponding to the time-division multiplexing transmission mode that is configured by a base station for the IAB node. However, in more application scenarios and more transmission modes, to improve network performance, impact caused by interference needs to be considered when transmit power and receive power of the IAB node are set. Therefore, how to configure power control parameters of the IAB node in different transmission modes is an urgent problem to be resolved in current IAB standardization.

SUMMARY

Embodiments of this application provide a power control method and a power control apparatus, to alleviate a transmission capacity decrease caused by interference, and improve transmission performance.

A first aspect of embodiments of this application provides a power control method. The method includes a first node determines a first power control parameter, where the first power control parameter is used to indicate first transmit power expected by the first node in a first transmission mode; and then, the first node sends a first message to a second node, where the first message carries the first power control parameter, the first message is used to request the first transmit power expected by the first node in the first transmission mode, and the second node is an upper-level node of the first node or a donor base station.

In this embodiment, for the first transmission mode, the first node may report, to the second node, the first power control parameter expected in the first transmission mode, so that the second node configures a power control parameter in the first transmission mode for the first node. In addition, when reporting the first power control parameter to the second node, the first node associates a transmission mode with a reported power control parameter. This helps alleviate a problem, for example, a transmission capacity decrease, caused by interference or the like, and improve transmission performance. For example, in space-division multiplexing transmission, the first node performs transmission to the second node by using transmit power determined by the first power control parameter, to effectively alleviate the transmission capacity decrease caused by the interference, and improve transmission performance.

In a possible implementation, the first message further carries a second power control parameter, and the second power control parameter is used to indicate second transmit power expected by the first node in a second transmission mode.

In the possible implementation, the first node may carry, by using one request message, two power control parameters expected in different transmission modes, so that the second node configures the power control parameter in the first transmission mode for the first node and configures a power control parameter in the second transmission mode for the first node.

In another possible implementation, the first power control parameter is further used to indicate second transmit power expected by the first node in a second transmission mode.

In the possible implementation, the first node requests, by using a same power control parameter, the first transmit power expected by the first node in the first transmission mode and the second transmit power expected by the first node in the second transmission mode, so that the second node separately configures a power control parameter in the first transmission mode and a power control parameter in the second transmission mode.

In another possible implementation, the first power control parameter includes a value or a value range of reference power, a value or a value range of subscriber-level nominal power, or an offset value of reference power.

In the possible implementation, the first power control parameter reported by the first node still uses some power control parameters used in an existing power control mechanism, and a manner that is used to configure power control parameters in more transmission modes and that is established based on the existing power control mechanism is provided.

In another possible implementation, the value of the subscriber-level nominal power is represented by an uplink shared channel-reference power and path loss parameter set index (P0 physical uplink shared channel alphaset identity, P0-PUSCH-AlphaSetID).

In the possible implementation, a P0-PUSCH-AlphaSet includes the P0-PUSCH-AlphaSetID, the value of the subscriber-level nominal power, and the like. Therefore, the value of the subscriber-level nominal power in the first power control parameter may be carried in the configured power control parameter P0-PUSCH-AlphaSet, and indirectly represented by the P0-PUSCH-AlphaSetID included in the P0-PUSCH-AlphaSet.

In another possible implementation, the first power control parameter further includes a path loss compensation factor and/or a path loss measurement reference signal index.

In the possible implementation, the first power control parameter may further include the path loss compensation factor and/or the path loss measurement reference signal index used in the existing power control mechanism. In this way, predictability of transmit power of the first node can be improved.

In another possible implementation, the path loss compensation factor is represented by the P0-PUSCH-AlphaSetID, and the path loss measurement reference signal index is represented by an uplink shared channel-path loss reference signal PUSCH-PathlossReferenceRS configuration.

In the possible implementation, a P0-PUSCH-AlphaSet includes the P0-PUSCH-AlphaSetID, the path loss compensation factor, and the like, and a PUSCH-PathlossReferenceRS includes the path loss measurement reference signal index, and the like. Therefore, the path loss compensation factor in the first power control parameter may be carried in the P0-PUSCH-AlphaSet and indirectly represented by the P0-PUSCH-AlphaSetID, and the path loss measurement reference signal index is represented by the PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In the possible implementation, the power control method in this embodiment of this application is applicable to configuration of power control parameters in a plurality of transmission modes such as space-division multiplexing transmission and full-duplex transmission. Therefore, two possible indication manners used to indicate the transmission mode corresponding to the first power control parameter are provided herein, to improve feasibility and integrity of the solution.

In another possible implementation, the first indication information includes first uplink sending timing information. The first uplink sending timing information is used to indicate the first transmission mode.

In the possible implementation, when the transmission mode is associated with uplink sending timing, the first indication information may indicate, by using uplink sending timing information, the transmission mode corresponding to the first power control parameter, to indicate a transmission mode of a reported power control parameter.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission. In the possible implementation, a plurality of specific transmission modes applicable to the power control method provided in this embodiment of this application are provided.

In another possible implementation, the first message is carried in radio resource control (radio resource control, RRC) signaling, a media (media) access control control element (medium access control control element, MAC CE), uplink control information (uplink control information, UCI), backhaul adaption protocol (Backhaul adaption protocol, BAP) signaling, or F1 interface application protocol signaling. In the possible implementation, an implementation in which the first message is carried on existing signaling is provided, to improve practicability of the solution.

In another possible implementation, the method further includes: The first node receives a reconfiguration message sent by the second node. The reconfiguration message carries a third power control parameter, and the third power control parameter is a power control parameter that is configured by the second node for the first node and that is used for the first transmission mode. Then, the first node performs transmission in the first transmission mode by using transmit power determined by the third power control parameter.

In the possible implementation, a possible feedback manner of the second node for the first message is provided, and the second node reconfigures the power control parameter in the first transmission mode for the first node.

In another possible implementation, the first power control parameter is partially or completely the same as the third power control parameter. In the possible implementation, the second node may obtain the third power control parameter by modifying configurations of some power control parameters in the first power control parameter. Alternatively, the second node obtains the third power control parameter by adding some power control parameters to the first power control parameter.

In another possible implementation, the method further includes the following step. When a first condition is met, the first node performs transmission by using transmit power determined by a power control parameter corresponding to the first transmission mode. The first condition includes any one of the following: The first node receives second indication information sent by a third node, where the second indication information is used to indicate the first node to perform transmission by using the transmit power determined by the power control parameter corresponding to the first transmission mode, and the third node is an upper-level node of the first node or a donor base station. The first node receives a first uplink sending timing indication sent by the second node, where the first uplink sending timing indication is associated with the first transmission mode. The first node determines, based on a current transmission frame structure of the first node, that a current transmission mode of the first node is the first transmission mode. Alternatively, when a second condition is met, the first node performs transmission by using transmit power determined by a power control parameter corresponding to the second transmission mode. The second condition includes any one of the following: The first node receives third indication information sent by a third node, where the third indication information is used to indicate the first node to perform transmission by using the transmit power determined by the power control parameter corresponding to the second transmission mode, and the third node is an upper-level node of the first node or a donor base station. The first node receives a second uplink sending timing indication sent by the second node, where the second uplink sending timing indication is associated with the second transmission mode. The first node determines, based on a current transmission frame structure of the first node, that a current transmission mode of the first node is the second transmission mode.

In the possible implementation, a plurality of specific possible conditions under which the first node performs transmission by using the transmit power determined by the power control parameter in the first transmission mode or the second transmission mode are provided. A second aspect of embodiments of this application provides a power control method. The method includes a second node receives a first message sent by a first node, where the first message carries a first power control parameter, the first power control parameter is used to indicate first transmit power expected by the first node in a first transmission mode, the first message is used to request the first transmit power expected by the first node in the first transmission mode, and the second node is an upper-level node of the first node or a donor base station.

In the possible implementation, the second node receives the first power control parameter that is expected in the first transmission mode and that is reported by the first node, so that the second node configures a power control parameter in the first transmission mode for the first node. In addition, when reporting the first power control parameter to the second node, the first node associates a transmission mode with a reported power control parameter. This helps alleviate a problem, for example, a transmission capacity decrease, caused by interference or the like, and improve transmission performance. For example, in space-division multiplexing transmission, the first node performs transmission to the second node by using transmit power determined by the first power control parameter, to effectively alleviate the transmission capacity decrease caused by the interference, and improve transmission performance.

In a possible implementation, the first message further carries a second power control parameter, and the second power control parameter is used to indicate second transmit power expected by the first node in a second transmission mode.

In the possible implementation, the first node may carry, by using one request message, two power control parameters expected in different transmission modes, so that the second node configures the power control parameter in the first transmission mode for the first node and configures a power control parameter in the second transmission mode for the first node.

In another possible implementation, the first power control parameter is further used to indicate second transmit power expected by the first node in a second transmission mode.

In the possible implementation, the first node requests, by using a same power control parameter, the first transmit power expected by the first node in the first transmission mode and the second transmit power expected by the first node in the second transmission mode, so that the second node separately configures a power control parameter in the first transmission mode and a power control parameter in the second transmission mode.

In another possible implementation, the first power control parameter includes a value or a value range of reference power, a value or a value range of subscriber-level nominal power, or an offset value of reference power.

In the possible implementation, the first power control parameter reported by the first node still uses some power control parameters used in an existing power control mechanism, and a manner that is used to configure power control parameters in more transmission modes and that is established based on the existing power control mechanism is provided.

In another possible implementation, the value of the subscriber-level nominal power is represented by a P0-PUSCH-AlphaSetID.

In the possible implementation, a P0-PUSCH-AlphaSet includes the P0-PUSCH-AlphaSetID, the value of the subscriber-level nominal power, and the like. Therefore, the value of the subscriber-level nominal power in the first power control parameter may be carried in the configured power control parameter P0-PUSCH-AlphaSet, and indirectly represented by the P0-PUSCH-AlphaSetID included in the P0-PUSCH-AlphaSet.

In another possible implementation, the first power control parameter further includes a path loss compensation factor and/or a path loss measurement reference signal index.

In the possible implementation, the first power control parameter may further include the path loss compensation factor and/or the path loss measurement reference signal index used in the existing power control mechanism. In this way, predictability of transmit power of the first node can be improved.

In another possible implementation, the path loss compensation factor is represented by the P0-PUSCH-AlphaSetID, and the path loss measurement reference signal index is represented by a PUSCH-PathlossReferenceRS configuration.

In the possible implementation, a P0-PUSCH-AlphaSet includes the P0-PUSCH-AlphaSetID, the path loss compensation factor, and the like, and a PUSCH-PathlossReferenceRS includes the path loss measurement reference signal index, and the like. Therefore, the path loss compensation factor in the first power control parameter may be carried in the P0-PUSCH-AlphaSet and indirectly represented by the P0-PUSCH-AlphaSetID, and the path loss measurement reference signal index is represented by the PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In the possible implementation, the power control method in this embodiment of this application is applicable to configuration of power control parameters in a plurality of transmission modes such as space-division multiplexing transmission and full-duplex transmission. Therefore, two possible indication manners used to indicate the transmission mode corresponding to the first power control parameter are provided herein, to improve feasibility and integrity of the solution.

In another possible implementation, the first indication information includes first uplink sending timing information. The first uplink sending timing information is used to indicate the first transmission mode.

In the possible implementation, when the transmission mode is associated with uplink sending timing, the first indication information may indicate, by using uplink sending timing information, the transmission mode corresponding to the first power control parameter, to indicate a transmission mode of a reported power control parameter.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission. In the possible implementation, a plurality of specific transmission modes applicable to the power control method provided in this embodiment of this application are provided.

In another possible implementation, the first message is carried in RRC signaling, a MAC CE, UCI, BAP signaling, or F1 interface application protocol signaling. In the possible implementation, an implementation in which the first message is carried on existing signaling is provided, to improve practicability of the solution.

In another possible implementation, the method further includes: The second node sends a reconfiguration message to the first node. The reconfiguration message carries a third power control parameter. The third power control parameter is a power control parameter that is configured by the second node for the first node and that is used for the first transmission mode.

In the possible implementation, a possible feedback manner of the second node for the first message is provided, and the second node reconfigures the power control parameter in the first transmission mode for the first node.

In another possible implementation, the first power control parameter is partially or completely the same as the third power control parameter. In the possible implementation, the second node may obtain the third power control parameter by modifying configurations of some power control parameters in the first power control parameter. Alternatively, the second node obtains the third power control parameter by adding some power control parameters to the first power control parameter.

In another possible implementation, the method further includes: The second node sends a power control parameter corresponding to the first transmission mode to a fourth node. The fourth node is an upper-level node of the first node or a donor base station.

In the possible implementation, the power control parameter corresponding to the first transmission mode is used by the fourth node to perform transmission in the first transmission mode by using transmit power determined by the power control parameter corresponding to the first transmission mode. Specifically, the second node may send, to the fourth node by using F1 signaling, the power control parameter corresponding to the first transmission mode.

A third aspect of embodiments of this application provides a power control method. The method includes a first node sends a second message to a second node, where the second message is used to request first receive power expected by the first node in a first transmission mode, and the second node is an upper-level node of the first node or a donor base station.

In this embodiment, for the first transmission mode, the first node may request, from the second node, the first receive power expected in the first transmission mode, so that the second node adjusts third transmit power used when the second node performs transmission to the first node, to alleviate a transmission capacity decrease caused by interference, and improve transmission performance.

In a possible implementation, the second message is further used to request second receive power expected by the first node in a second transmission mode.

In the possible implementation, the first node requests, by using one request message, configuration of the first receive power in the first transmission mode and configuration of the second receive power in the second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/physical broadcasting channel, and a channel state information reference signal. The power scaling factor is multiplied by the receive power or the transmit power of any one of the demodulation reference signal, the synchronization signal/physical broadcasting channel, and the channel state information reference signal, to obtain the first receive power.

In the possible implementation, a specific form of the second message is provided, and a power control parameter carried in the second message is shown, so that the second node adjusts the third transmit power used when the second node performs transmission to the first node in the first transmission mode.

In another possible implementation, the second message is a receive power adjustment request message. The receive power adjustment request message carries fourth indication information. The fourth indication information is used to indicate to trigger the second node to adjust third transmit power. The third transmit power is transmit power used when the second node performs transmission to the first node in the first transmission mode. Alternatively, the fourth indication information is used to indicate the second node to increase or decrease third transmit power.

In the possible implementation, another specific form of the second message is provided, and a manner of indicating, by using the fourth indication information carried in the second message, the second node to adjust the third transmit power used when the second node performs transmission to the first node in the first transmission mode is shown.

In another possible implementation, the second message is a receive power adjustment request message. The receive power adjustment request message carries a first adjustment value. The first adjustment value is used by the second node to adjust third transmit power. The third transmit power is transmit power used when the second node performs transmission to the first node in the first transmission mode. Alternatively, the receive power adjustment request message carries a first bit, and the first bit corresponds to the first adjustment value.

In the possible implementation, another specific form of the second message is provided, and a manner of indicating, by using an adjustment value or a bit carried in the second message, the second node to adjust the third transmit power used when the second node performs transmission to the first node in the first transmission mode is shown.

In another possible implementation, the receive power adjustment request message is carried in a MAC CE, UCI, or RRC signaling. In the possible implementation, the receive power adjustment request message may be carried in existing signaling, to improve practicability of the solution.

In another possible implementation, the method further includes: The first node receives first acknowledgment information sent by the second node. Then, the first node determines, based on the first acknowledgment information, that the second node has received the second message. In the possible implementation, a feedback manner of the second node for the second message is provided, to notify the first node that the second node has received the second message.

A fourth aspect of embodiments of this application provides a power control method. The method includes:

a second node receives a second message sent by a first node, where the second message is used to request first receive power expected by the first node in a first transmission mode, and the second node is an upper-level node of the first node or a donor base station.

In this embodiment, for the first transmission mode, the second node receives the second message that is sent by the first node and that is used to request the first receive power expected by the first node in the first transmission mode, so that the second node adjusts third transmit power used when the second node performs transmission to the first node, to alleviate a transmission capacity decrease caused by interference, and improve transmission performance.

In a possible implementation, the second message is further used to request second receive power expected by the first node in a second transmission mode.

In the possible implementation, the first node requests, by using one request message, configuration of the first receive power in the first transmission mode and configuration of the second receive power in the second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/physical broadcasting channel, and a channel state information reference signal. The power scaling factor is multiplied by the receive power or the transmit power of any one of the demodulation reference signal, the synchronization signal/physical broadcasting channel, and the channel state information reference signal, to obtain the first receive power.

In the possible implementation, a specific form of the second message is provided, and a power control parameter carried in the second message is shown, so that the second node adjusts the third transmit power used when the second node performs transmission to the first node in the first transmission mode.

In another possible implementation, the second message is a receive power adjustment request message. The receive power adjustment request message carries fourth indication information. The fourth indication information is used to indicate to trigger the second node to adjust third transmit power. The third transmit power is transmit power used when the second node performs transmission to the first node in the first transmission mode. Alternatively, the fourth indication information is used to indicate the second node to increase or decrease third transmit power.

In the possible implementation, another specific form of the second message is provided, and a manner of indicating, by using the fourth indication information carried in the second message, the second node to adjust the third transmit power used when the second node performs transmission to the first node in the first transmission mode is shown.

In another possible implementation, the second message is a receive power adjustment request message. The receive power adjustment request message carries a first adjustment value. The first adjustment value is used by the second node to adjust third transmit power. The third transmit power is transmit power used when the second node performs transmission to the first node in the first transmission mode. Alternatively, the receive power adjustment request message carries a first bit, and the first bit corresponds to the first adjustment value.

In the possible implementation, another specific form of the second message is provided, and a manner of indicating, by using an adjustment value or a bit carried in the second message, the second node to adjust the third transmit power used when the second node performs transmission to the first node in the first transmission mode is shown.

In another possible implementation, the receive power adjustment request message is carried in a MAC CE, UCI, or RRC signaling. In the possible implementation, the receive power adjustment request message may be carried in existing signaling, to improve practicability of the solution.

In another possible implementation, the method further includes: The second node sends first acknowledgment information to the first node. The first acknowledgment information is used to notify the first node that the second node has received the second message.

In the possible implementation, a feedback manner of the second node for the second message is provided, to notify the first node that the second node has received the second message.

A fifth aspect of embodiments of this application provides a power control apparatus. The power control apparatus includes:

a processing module, configured to determine a first power control parameter, where the first power control parameter is used to indicate first transmit power expected by the power control apparatus in a first transmission mode; and a transceiver module, configured to send a first message to a second node, where the first message carries the first power control parameter, the first message is used to request the first transmit power expected by the power control apparatus in the first transmission mode, and the second node is an upper-level node of the power control apparatus or a donor base station.

In a possible implementation, the first message further carries a second power control parameter, and the second power control parameter is used to indicate second transmit power expected by the power control apparatus in a second transmission mode.

In another possible implementation, the first power control parameter is further used to indicate second transmit power expected by the power control apparatus in a second transmission mode.

In another possible implementation, the first power control parameter includes a value or a value range of reference power, a value or a value range of subscriber-level nominal power, or an offset value of reference power.

In another possible implementation, the value of the subscriber-level nominal power is represented by a P0-PUSCH-AlphaSetID.

In another possible implementation, the first power control parameter further includes a path loss compensation factor and/or a path loss measurement reference signal index.

In another possible implementation, the path loss compensation factor is represented by the P0-PUSCH-AlphaSetID, and the path loss measurement reference signal index is represented by a PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In another possible implementation, the first indication information includes first uplink sending timing information. The first uplink sending timing information is used to indicate the first transmission mode.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission.

In another possible implementation, the first message is carried in RRC signaling, a MAC CE, UCI, BAP signaling, or F1 interface application protocol signaling.

In another possible implementation, the transceiver module is further configured to:

receive a reconfiguration message sent by the second node, where the reconfiguration message carries a third power control parameter, the third power control parameter is a power control parameter that is configured by the second node for the power control apparatus and that is used for the first transmission mode.

The processing module is further configured to:

perform transmission in the first transmission mode by using transmit power determined by the third power control parameter.

In another possible implementation, the first power control parameter is partially or completely the same as the third power control parameter.

In another possible implementation, the processing module is further configured to:

when a first condition is met, perform transmission by using transmit power determined by a power control parameter corresponding to the first transmission mode, where the first condition includes any one of the following: the power control apparatus receives second indication information sent by a third node, where the second indication information is used to indicate the power control apparatus to perform transmission by using the transmit power determined by the power control parameter corresponding to the first transmission mode, and the third node is an upper-level node of the power control apparatus or a donor base station; the power control apparatus receives a first uplink sending timing indication sent by the second node, where the first uplink sending timing indication is associated with the first transmission mode; and the power control apparatus determines, based on a current transmission frame structure of the power control apparatus, that a current transmission mode of the power control apparatus is the first transmission mode; or when a second condition is met, perform transmission by using transmit power determined by a power control parameter corresponding to the second transmission mode, where the second condition includes any one of the following: the power control apparatus receives third indication information sent by a third node, where the third indication information is used to indicate the power control apparatus to perform transmission by using the transmit power determined by the power control parameter corresponding to the second transmission mode, and the third node is an upper-level node of the power control apparatus or a donor base station; the power control apparatus receives a second uplink sending timing indication sent by the second node, where the second uplink sending timing indication is associated with the second transmission mode; and the power control apparatus determines, based on a current transmission frame structure of the power control apparatus, that a current transmission mode of the power control apparatus is the second transmission mode.

A sixth aspect of embodiments of this application provides a power control apparatus. The power control apparatus includes a transceiver module, configured to receive a first message sent by a first node, where the first message carries a first power control parameter, the first power control parameter is used to indicate first transmit power expected by the first node in a first transmission mode, the first message is used to request the first transmit power expected by the first node in the first transmission mode, and the power control apparatus is an upper-level node of the first node or a donor base station.

In a possible implementation, the first message further carries a second power control parameter, and the second power control parameter is used to indicate second transmit power expected by the first node in a second transmission mode.

In another possible implementation, the first power control parameter is further used to indicate second transmit power expected by the first node in a second transmission mode.

In another possible implementation, the first power control parameter includes a value or a value range of reference power, a value or a value range of subscriber-level nominal power, or an offset value of reference power.

In another possible implementation, the value of the subscriber-level nominal power is represented by a P0-PUSCH-AlphaSetID.

In another possible implementation, the first power control parameter further includes a path loss compensation factor and/or a path loss measurement reference signal index.

In another possible implementation, the path loss compensation factor is represented by the P0-PUSCH-AlphaSetID, and the path loss measurement reference signal index is represented by a PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In another possible implementation, the first indication information includes first uplink sending timing information. The first uplink sending timing information is used to indicate the first transmission mode.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission.

In another possible implementation, the first message is carried in RRC signaling, a MAC CE, UCI, BAP signaling, or F1 interface application protocol signaling.

In another possible implementation, the transceiver module is further configured to send a reconfiguration message to the first node, where the reconfiguration message carries a third power control parameter, and the third power control parameter is a power control parameter that is configured by the power control apparatus for the first node and that is used for the first transmission mode.

In another possible implementation, the first power control parameter is partially or completely the same as the third power control parameter.

In another possible implementation, the transceiver module is further configured to send a power control parameter corresponding to the first transmission mode to a fourth node, where the fourth node is an upper-level node of the first node or a donor base station.

A seventh aspect of embodiments of this application provides a power control apparatus. The power control apparatus includes a transceiver module, configured to send a second message to a second node, where the second message is used to request first receive power expected by the power control apparatus in a first transmission mode, and the second node is an upper-level node of the power control apparatus or a donor base station.

In a possible implementation, the second message is further used to request second receive power expected by the power control apparatus in a second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/ physical broadcasting channel, and a channel state information reference signal. The power scaling factor is multiplied by the receive power or the transmit power of any one of the demodulation reference signal, the synchronization signal/ physical broadcasting channel, and the channel state information reference signal, to obtain the first receive power.

In another possible implementation, the second message is a receive power adjustment request message. The receive power adjustment request message carries fourth indication information. The fourth indication information is used to indicate to trigger the second node to adjust third transmit power. The third transmit power is transmit power used when the second node performs transmission to the power control apparatus in the first transmission mode. Alternatively, the fourth indication information is used to indicate the second node to increase or decrease third transmit power.

In another possible implementation, the second message is a receive power adjustment request message. The receive power adjustment request message carries a first adjustment value. The first adjustment value is used by the second node to adjust third transmit power. The third transmit power is transmit power used when the second node performs transmission to the power control apparatus in the first transmission mode. Alternatively, the receive power adjustment request message carries a first bit, and the first bit corresponds to the first adjustment value.

In another possible implementation, the receive power adjustment request message is carried in a MAC CE, UCI, or RRC signaling.

In another possible implementation, the transceiver module is further configured to receive first acknowledgment information sent by the second node.

The power control apparatus further includes a processing module.

The processing module is configured to determine, based on the first acknowledgment information, that the second node has received the second message.

An eighth aspect of embodiments of this application provides a power control apparatus. The power control apparatus includes a transceiver module, configured to receive a second message sent by a first node, where the second message is used to request first receive power expected by the first node in a first transmission mode, and the power control apparatus is an upper-level node of the first node or a donor base station.

In a possible implementation, the second message is further used to request second receive power expected by the first node in a second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/ physical broadcasting channel, and a channel state information reference signal. The power scaling factor is multiplied by the receive power or the transmit power of any one of the demodulation reference signal, the synchronization signal/ physical broadcasting channel, and the channel state information reference signal, to obtain the first receive power.

In another possible implementation, the second message is a receive power adjustment request message. The receive power adjustment request message carries fourth indication information. The fourth indication information is used to indicate to trigger the power control apparatus to adjust third transmit power. The third transmit power is transmit power used when the power control apparatus performs transmission to the first node in the first transmission mode. Alternatively, the fourth indication information is used to indicate the power control apparatus to increase or decrease third transmit power.

In another possible implementation, the second message is a receive power adjustment request message. The receive power adjustment request message carries a first adjustment value. The first adjustment value is used by the power control apparatus to adjust third transmit power. The third transmit power is transmit power used when the power control apparatus performs transmission to the first node in the first transmission mode. Alternatively, the receive power adjustment request message carries a first bit, and the first bit corresponds to the first adjustment value.

In another possible implementation, the receive power adjustment request message is carried in a MAC CE, UCI, or RRC signaling.

In another possible implementation, the transceiver module is further configured to:
send first acknowledgment information to the first node, where the first acknowledgment information is used to notify the first node that the power control apparatus has received the second message.

A ninth aspect of embodiments of this application provides a power control apparatus. The power control apparatus includes a processor, a memory, an input/output device, and a bus. The memory stores computer instructions. When executing the computer instructions in the memory, the processor is configured to implement any implementation of the first aspect.

In a possible implementation of the ninth aspect, the processor, the memory, and the input/output device are separately connected to the bus.

A tenth aspect of embodiments of this application provides a power control apparatus. The power control apparatus includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the second aspect.

In a possible implementation of the tenth aspect, the processor, the memory, and the input/output device are separately connected to the bus.

An eleventh aspect of embodiments of this application provides a power control apparatus. The power control apparatus includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the third aspect.

In a possible implementation of the eleventh aspect, the processor, the memory, and the input/output device are separately connected to the bus.

A twelfth aspect of embodiments of this application provides a power control apparatus. The power control apparatus includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the fourth aspect.

In a possible implementation of the twelfth aspect, the processor, the memory, and the input/output device are separately connected to the bus.

A thirteenth aspect of embodiments of this application provides a computer program product including instructions. When the computer program product runs on a computer, the computer is enabled to perform any one of the implementations of the first aspect, the second aspect, the third aspect, and the fourth aspect.

A fourteenth aspect of embodiments of this application provides a computer-readable storage medium including instructions. When the instructions are run on a computer, the computer is enabled to perform any one of the implementations of the first aspect, the second aspect, the third aspect, and the fourth aspect.

A fifteenth aspect of embodiments of this application provides a chip, including a memory and a processor. The memory is configured to store a computer program, and the processor is configured to invoke the computer program from the memory and run the computer program, so that the processor performs any implementation of any one of the first aspect, the second aspect, the third aspect, and the fourth aspect.

A sixteenth aspect of embodiments of this application provides a communication system. The communication system includes the power control apparatus according to the fifth aspect and the power control apparatus according to the sixth aspect. Alternatively, the communication system includes the power control apparatus according to the seventh aspect and the power control apparatus according to the eighth aspect.

According to the foregoing technical solutions, it can be learned that embodiments of this application have the following advantages:

It can be learned from the foregoing solutions that the first node determines the first power control parameter, where the first power control parameter is used to indicate the first transmit power expected by the first node in the first transmission mode, and then the first node sends the first message to the second node, where the first message carries the first power control parameter, the first message is used to request the first transmit power expected by the first node in the first transmission mode, and the second node is an upper-level node of the first node or a donor base station. It can be learned that, for the first transmission mode, the first node may report, to the second node, the first power control parameter expected in the first transmission mode, so that the second node configures the power control parameter in the first transmission mode for the first node. In addition, when reporting the first power control parameter to the second node, the first node associates the transmission mode with the reported power control parameter. This helps alleviate the problem, for example, the transmission capacity decrease, caused by the interference or the like, and improve transmission performance. For example, in space-division multiplexing transmission, the first node performs transmission to the second node by using the transmit power determined by the first power control parameter, to effectively alleviate the transmission capacity decrease caused by the interference, and improve transmission performance.

BRIEF DESCRIPTION OF DRAWINGS

FIG. 2(a) is a schematic diagram of a scenario of uplink full-duplex transmission according to an embodiment of this application;

FIG. 2(b) is a schematic diagram of a sending scenario of space-division multiplexing transmission according to an embodiment of this application;

FIG. 2(c) is a schematic diagram of a scenario of downlink full-duplex transmission according to an embodiment of this application;

FIG. 2(d) is a schematic diagram of a receiving scenario of space-division multiplexing transmission according to an embodiment of this application;

DESCRIPTION OF EMBODIMENTS

Embodiments of this application provide a power control method and a power control apparatus, to alleviate a transmission capacity decrease caused by interference, and improve transmission performance.

Figure 1A:
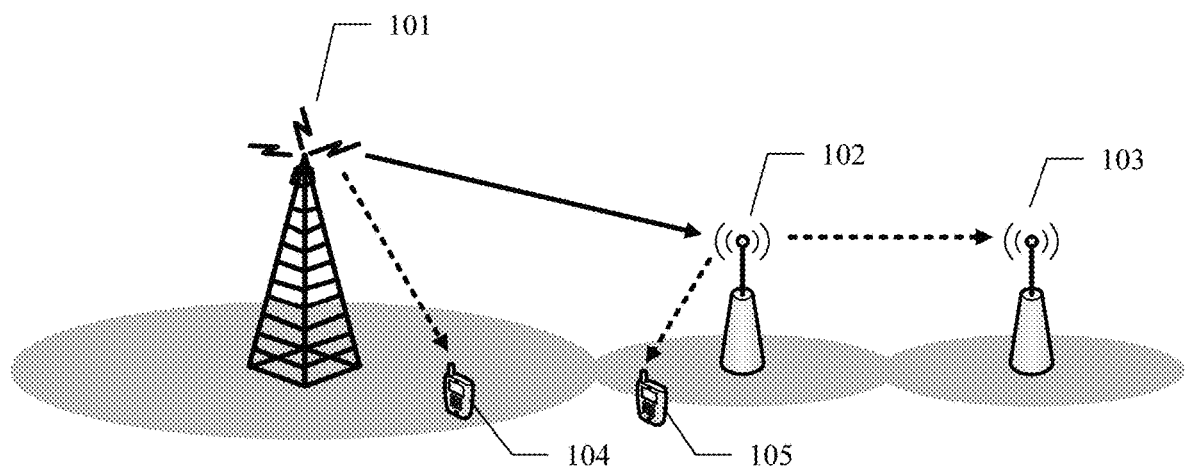
FIG. 1A is a schematic diagram of a communication system according to an embodiment of this application.

FIG. 1A shows an IAB system to which an embodiment of this application is applied. The IAB system includes at least one base station 101, a terminal device 104 served by the base station 101, a relay node 103, a relay node 102, and a terminal device 105 served by the relay node 102. Usually, the base station 101 is referred to as a donor base station, or may be referred to as a donor node, and the terminal device is also referred to as a terminal. A base station includes but is not limited to an eNB, a radio network controller (radio network controller, RNC), a NodeB (node B, NB), a base station controller (base station controller, BSC), a base transceiver station (base transceiver station, BTS), a home base station (for example, a home evolved node B, or a home node B, HNB), a baseband unit (baseband unit, BBU), or a new radio base station (for example, a gNB), a transmission reception point TRP, a transmission point TP, or the like.

The relay node 103 is an upper-level node of the relay node 102, and the relay node 102 is a lower-level node of the base station 101. Usually, a lower-level node may be considered as a terminal of an upper-level node.

In FIG. 1A, the donor base station is configured to access a core network. Alternatively, the donor base station serves as an anchor base station of a radio access network, and accesses the network by using the anchor base station. The anchor base station is responsible for processing data at a packet data convergence protocol (packet data convergence protocol, PDCP) layer, receiving data from the core network and forwarding the data to a relay node, or receiving data from a relay node and forwarding the data to the core network.

For ease of description, in the following, the relay node is referred to as a first node, and an upper-level node of the first node is referred to as a second node. The first node is a relay node, or a terminal having a relay function, or any device having a relay function. The second node is a donor base station, or a relay node, or a terminal having a relay function, or any device having a relay function. The following shows two possible application scenarios of the first node and the second node by using an example in which embodiments of this application are applied to the IAB system.

1. The first node is an IAB node, and the second node is the donor base station.

Figure 1B:
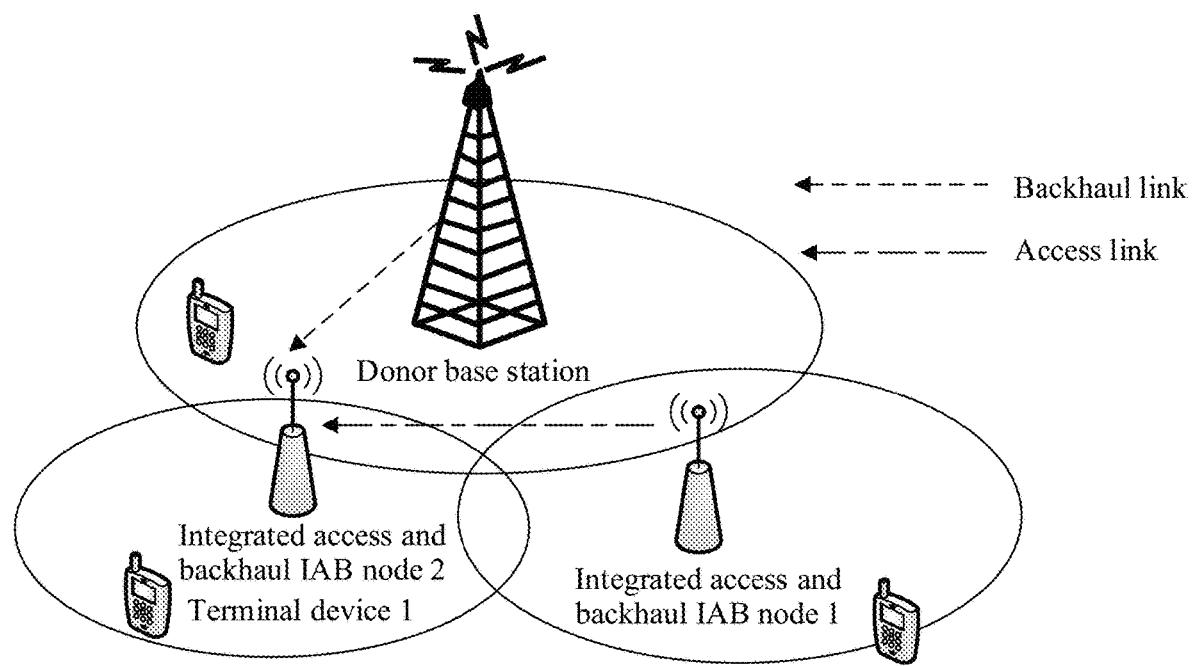
FIG. 1B is a schematic diagram of a scenario of a backhaul link and an access link according to an embodiment of this application.

For example, as shown in FIG. 1B, the first node is an IAB node 2, the second node is the donor base station, and the donor base station is an upper-level node of the IAB node 2.

2. Both the first node and the second node are IAB nodes, and the first node is a lower-level node of the second node.

For example, as shown in FIG. 1B, the first node is an IAB node 1, the second node is an IAB node 2, and the IAB node 2 is an upper-level node of the IAB node 1.

In this embodiment of this application, to improve network performance in more transmission modes, impact caused by interference needs to be considered when transmit power and receive power of the IAB node are configured. However, impact caused by interference between the transmit power and the receive power of the IAB node is mainly caused by interference between a backhaul link and an access link. Alternatively, to improve network performance in more transmission modes, when receiving a signal, a receiver of the IAB node does not exceed a dynamic range that can be supported by a hardware capability of the IAB node, The following describes the backhaul link and the access link by using the scenario shown in FIG. 1B as an example. As shown in FIG. 1B, the donor base station is the upper-level node of the IAB node 2, and the IAB node 1 is a lower-level node of the IAB node 2. In the IAB system, a link for communication between the IAB node 2 and the upper-level node (for example, the donor base station) is usually referred to as the backhaul link. A link for communication between the IAB node 2 and the lower-level node (for example, the IAB node 1 or the terminal device 1) is usually referred to as the access link.

Optionally, in some communication protocols or communication architectures, a link for communication between an IAB node and a lower-level node is also referred to as a backhaul link, and a link for communication between the IAB node and a terminal device is referred to as an access link. This is not specifically limited in this application. The following uses an example in which the link for communication between the IAB node and the lower-level node or the terminal device is referred to as the access link for description.

Figure 1C:
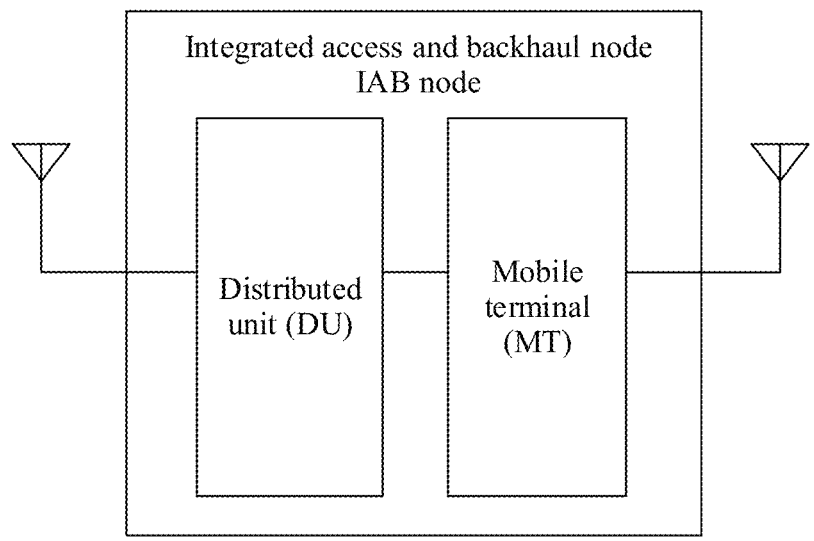
FIG. 1C is a schematic diagram of a functional structure of an IAB node according to an embodiment of this application.

The IAB node is functionally divided into an IAB mobile-termination (mobile terminating, MT) and an IAB distributed unit (distributed unit, DU). Specifically, as shown in FIG. 1C, the LAB MT means that the IAB node accesses an upper-level node as a terminal device. The IAB DU means that the IAB node, serving as a distributed unit of a base station, provides an access service for UE and another lower-level node. Usually, the IAB MT communicates with the upper-level node by using a backhaul link, the IAB DU communicates with the lower-level node by using a backhaul link, and the IAB DU communicates with a terminal device by using an access link.

Both the MT and the DU in the IAB node shown in FIG. 1C have complete transceiver modules, and there is an interface between the MT and the DU. However, the MT and the DU are logical modules. In actual application, the MT and the DU may share some sub-modules. For example, the MT and the DU share a transceiver antenna, a baseband processing module, and the like. Alternatively, the MT and the DU may share hardware. A specific implementation of the MT and the DU is not limited in the present invention.

It should be understood that the term "and/or" used in this specification describes only an association relationship for describing associated objects and represents that three relationships may exist. For example, A and/or B may represent the following three cases: Only A exists, only B exists, and both A and B exist.

To improve network performance in more transmission modes, the impact caused by the interference or a constraint caused by a hardware capability need to be considered when the transmit power and the receive power of the IAB node are configured. Embodiments of this application are applicable to transmission modes including but not limited to space-division multiplexing transmission and full-duplex transmission.

Space-division multiplexing transmission means that, at a same moment, the IAB node may send an uplink signal to an upper-level node by using a backhaul link, and may send a downlink signal to a lower-level node or a terminal device by using an access link. Alternatively, space-division multiplexing transmission means that, at a same moment, the IAB node may receive a downlink signal sent by an upper-level node on a backhaul link, and may receive an uplink signal sent by a lower-level node or a terminal device on an access link.

Full-duplex transmission means that, at a same moment, the IAB node may receive, by using an access link, an uplink signal sent by a lower-level node, and may send an uplink signal to an upper-level node by using a backhaul link. Alternatively, full-duplex transmission means that, at a same moment, the IAB node may receive, by using a backhaul link, a downlink signal sent by an upper-level node, and may send a downlink signal to a lower-level node by using an access link.

In full-duplex transmission, a frequency band used on the access link and a frequency band used on the backhaul link are a same frequency band or different frequency bands. When the frequency band used on the access link and the frequency band used on the backhaul link are the same frequency band, the access link and the backhaul link may use a same frequency of the same frequency band, or use different frequencies of the same frequency band.

With reference to FIG. 2(a) to FIG. 2(d), the following describes, by using examples, some specific transmission scenarios to which embodiments of this application are applicable. Embodiments of this application are also applicable to a scenario that is not shown in embodiments of this application and that has a similar requirement. This is not limited in this application.

FIG. 2(a) is a schematic diagram of a scenario of uplink full-duplex transmission according to an embodiment of this application. At a same moment, an IAB node 1 not only sends an uplink signal to a donor base station by using a backhaul link, but also receives, by using an access link, an uplink signal sent by an IAB node 2. The IAB node 1 is an upper-level node of the IAB node 2. However, if transmit power for sending the uplink signal by the IAB node 1 to the donor base station is excessively high, a problem of interference to a receiver of the IAB node 1 is caused. To be specific, receiving of the uplink signal from the IAB node 2 by the IAB node 1 is affected, and an interference effect on uplink receiving of the IAB node 1 is generated.

FIG. 2(b) is a schematic diagram of a sending scenario of space-division multiplexing transmission according to an embodiment of this application. At a same moment, the IAB node 1 not only sends an uplink signal to the donor base station by using a backhaul link, but also sends a downlink signal sent to the IAB node 2 by using an access link. The IAB node 1 is an upper-level node of the IAB node 2. However, if the transmit power for sending the uplink signal by the IAB node 1 to the donor base station is excessively high, sending of the downlink signal by the IAB node 1 to the IAB node 2 is affected, and an interference effect on downlink sending of the IAB node 1 is caused. If the transmit power for sending the downlink signal by the IAB node 1 to the IAB node 2 is excessively high, sending of the uplink signal by the IAB node 1 to the donor base station is affected, and an interference effect on uplink sending of the IAB node 1 is caused.

Figure 3A:
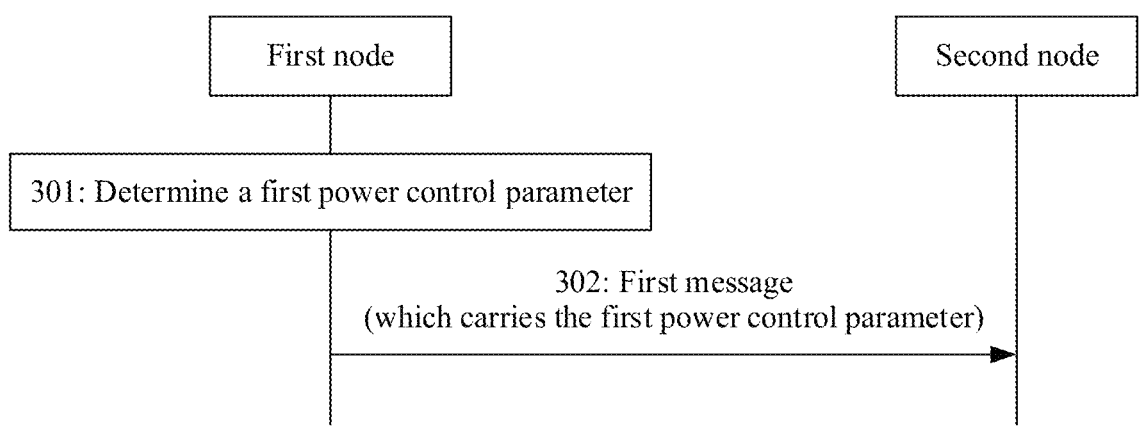
FIG. 3A is a schematic diagram of an embodiment of a power control method according to an embodiment of this application.

For the transmission scenario shown in FIG. 2(a) or FIG. 2(b), an embodiment of this application provides a power control method shown in FIG. 3A, to control uplink transmit power of the IAB node 1 in the transmission mode shown in FIG. 2(a) or FIG. 2(b), so as to alleviate a problem, for example, a transmission capacity decrease, caused by interference or the like, and improving network transmission performance.

FIG. 2(c) is a schematic diagram of a scenario of downlink full-duplex transmission according to an embodiment of this application. At a same moment, the IAB node 1 not only receives, by using a backhaul link, a downlink signal sent by the donor base station, but also sends a downlink signal to the IAB node 2 by using an access link. The IAB node 1 is an upper-level node of the IAB node 2. However, if transmit power for sending the downlink signal by the donor base station to the IAB node 2 is excessively high, sending of the downlink signal by the IAB node 1 to the IAB node 2 is affected, and an interference effect on downlink sending of the IAB node 1 is caused.

FIG. 2(d) is a schematic diagram of a receiving scenario of space-division multiplexing transmission according to an embodiment of this application. At a same moment, the IAB node 1 not only receives, by using a backhaul link, a downlink signal sent by the donor base station, but also receives, by using an access link, an uplink signal sent by the IAB node 2. The IAB node 1 is an upper-level node of the IAB node 2. However, if the transmit power for sending the downlink signal by the donor base station to the IAB node 1 is excessively high, receiving of the uplink signal by the IAB node 1 from the IAB node 2 or a terminal device is affected, and an interference effect on uplink receiving of the IAB node 1 or a terminal device is caused. Alternatively, if receive power for receiving the uplink signal sent by the IAB node 2 by the IAB node 1 is excessively high, receiving of the downlink signal from the donor base station by the IAB node 1 is affected, and an interference effect on downlink receiving of the IAB node 1 is caused.

Figure 4:
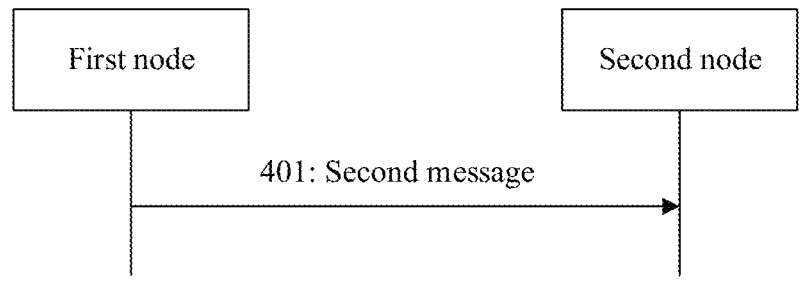
FIG. 4 is a schematic diagram of another embodiment of a power control method according to an embodiment of this application.

For the transmission scenario shown in FIG. 2(c) or FIG. 2(d), an embodiment of this application provides a power control method shown in FIG. 4, to control downlink receive power of the IAB node 1 in the transmission mode shown in FIG. 2(c) or FIG. 2(d), so as to alleviate the problem, for example, the transmission capacity decrease, caused by the interference or the like, and improving network transmission performance.

FIG. 3A is a schematic diagram of an embodiment of a power control method according to an embodiment of this application. In FIG. 3A, the method includes the following steps.

Step 301: A first node determines a first power control parameter.

The first power control parameter is used to indicate first transmit power expected by the first node in a first transmission mode.

The first power control parameter may include a value or a value range of reference power $P_{O\_PUSCH}$, a value or a value range of subscriber-level nominal power $P_{O\_UE\_PUSCH}$, or an offset value of reference power. The offset value of the reference power is an offset relative to existing reference power in a time-division multiplexing (time division multiplexing, TDM) mode, or an offset of reference power configured based on a power control parameter received by the first node.

Optionally, the first power control parameter further includes any one or more of the following: a path loss compensation factor, a path loss measurement reference signal index, an uplink channel or uplink signal-reference power and path loss parameter set index, an uplink channel or uplink signal-path loss reference signal configuration, an uplink channel or uplink signal-sounding resource index-power control parameter configuration, a reference power-uplink channel or uplink signal configuration set configuration, a first upper limit of transmit power in the first transmission mode, a first lower limit of the transmit power in the first transmission mode, a value range of a difference between the first upper limit and the first lower limit, and an accumulated value of dynamic power control.

The path loss measurement reference signal index may include a synchronization signal/physical broadcasting channel timing index (synchronization signal/physical broadcasting channel timing index, SS/PBCH timing index), or a channel state information reference signal resource index (channel state information reference signal resource ID, CSI-RS resource ID).

Optionally, an uplink channel is a PUSCH or a physical uplink control channel (physical uplink control channel, PUCCH). An uplink signal is an uplink reference signal, for example, a sounding reference signal (sounding reference signal, SRS).

In a possible implementation, the first power control parameter further includes a modulation and coding scheme (modulation and coding scheme, MCS). Each MCS index range has a corresponding power control parameter. For example, that MCS indexes=17 to 28 correspond to one group of power control parameters, and that MCS indexes=10 to 16 correspond to another group of power control parameters.

It can be learned from the foregoing description that the first power control parameter includes an expected power control parameter and a configured power control parameter. The expected power control parameter includes a currently defined power control parameter and a newly defined power control parameter. The configured power control parameter is an existing power control parameter in the time-division multiplexing (time division multiplexing, TDM) mode.

1. The following describes the currently defined power control parameter carried in the first power control parameter.

Specifically, the defined power control parameter may be determined based on an uplink power control mechanism defined in a 3GPP NR standard. The power control method in this embodiment of this application is applicable to an uplink channel (for example, a physical uplink shared channel or a physical uplink control channel) or an uplink signal (for example, an uplink reference signal SRS). The following describes a current uplink power control mechanism of NR by using the PUSCH channel as an example. UE determines uplink transmit power on the PUSCH channel by mainly depending on the following formula 1.

$$P_{PUSCH,b,f,c}(i, j, q_d, l) = \min \left\{ \begin{array}{l} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

In $P_{PUSCH,b,f,c}(i, j, q_d, l)$, PUSCH refers to a PUSCH channel. b represents a current bandwidth (bandwidth part, BWP) of the PUSCH channel. f represents a current carrier frequency of the PUSCH channel. c represents a current cell (cell). i represents a transmission occasion of the PUSCH channel. j represents a power control parameter set index. $q_d$ represents a reference signal used for calculating path loss. l represents a power control adjustment state index.

$P_{CMAX,f,c}(i)$ represents a maximum uplink transmit power of the UE, and a value of $P_{CMAX,f,c}(i)$ is limited based on a regulation and is limited by a communication protocol.

$P_{O\_PUSCH}$ represents reference power, and may be understood as a reference value for power control. The reference power is generally related to a configuration of a base station, and the base station adjusts or modifies the power control parameter based on a value of $P_{O\_PUSCH}$. Specifically, $P_{O\_PUSCH} = P_{O\_UE\_PUSCH} + P_{O\_NOMINAL\_PUSCH}$. $P_{O\_UE\_PUSCH}$ represents a value of configured subscriber-level nominal power, and $P_{O\_NOMINAL\_PUSCH}$ represents uplink transmit power when the UE initially successfully accesses a network.

$10 \log_{10}(2^\mu \cdot M_{RB,b,f,c}^{PUSCH}(i))$ represents a bandwidth compensation factor, and is related to a current subcarrier spacing and scheduling bandwidth. Larger bandwidth indicates a larger value of the bandwidth compensation factor.

$\alpha_{b,f,c}(j) \cdot PL_{b,f,c}(q_d)$ represents path loss compensation, and $\alpha_{b,f,c}(j)$ represents a path compensation factor. Specifically, the base station may configure the path compensation factor by using a parameter set. Generally, a value range of the path compensation factor is [0,1]. $PL_{b,f,c}(q_d)$ represents the path loss calculated or measured based on the reference signal $q_d$. For example, the UE knows transmit power P of the reference signal $q_d$ on a base station side, the UE measures the reference signal $q_d$ to obtain receive power of the reference signal $q_d$. In this case, the path loss of $q_d$=the transmit power of $q_d$–the receive power of $q_d$.

$\Delta_{TF,b,f,c}(i)$ is related to a modulation and coding scheme and a quantity of subcarriers occupied by the reference signal in bandwidth. $\Delta_{TF,b,f,c}(i)$ is used by the base station to further supplement power according to a status of resource transmission during specific scheduling. Optionally, the base station may be configured not to enable this function.

$f_{b,f,c}(i, l)$ represents an adjustment result of the dynamic power control. Specifically, the base station may adjust $f_{b,f,c}(i, l)$ by using physical layer control signaling DCI. $f_{b,f,c}(i, l)$ represents an accumulated value, and is related to a value of a previous transmission occasion of the PUSCH channel.

min(x) represents that a smaller value of x is used. The UE calculates the transmit power based on various parameters, and sends the signal based on transmit power represented by $P_{CMAX,f,c}(i)$ if a calculated transmit power exceeds $P_{CMAX,f,c}(i)$.

It can be learned from the foregoing NR-based power control parameter mechanism that, in this embodiment of this application, the first power control parameter reported by the first node may at least partially use power control parameters used in an existing uplink power control mechanism, and the first node reports the first power control parameter, to implement differentiated configuration of power control parameters in more transmission modes. For example, the value or the value range of the reference power $P_{O\_PUSCH}$, the value or the value range of the subscriber-level nominal power $P_{O\_UE\_PUSCH}$, the offset value of the reference power, the path loss compensation factor, the path loss measurement reference signal index, and the accumulated value of the dynamic power control that are carried in the first power control parameter are all power control parameters used in the existing uplink power control mechanism.

The accumulated value of the dynamic power control is used by a second node to determine uplink transmit power of the first node based on the dynamic power control. The following describes several possible cases of the accumulated value of the dynamic power control.

(1). When the first power control parameter does not include the accumulated value of the dynamic power control, the second node considers by default that a reference accumulated value of the dynamic power control is 0.

(2). When the first power control parameter does not include the accumulated value of the dynamic power control, the second node uses, by default, an accumulated value of the dynamic power control in the TDM mode at a previous moment as a reference accumulated value of the dynamic power control.

(3). When the first power control parameter does not include the accumulated value of the dynamic power control parameter, the second node uses, by default, an accumulated value of the dynamic power control during previous full-duplex transmission or space-division multiplexing transmission as a reference accumulated value of the dynamic power control.

(4). When the first power control parameter does not include the accumulated value of the dynamic power control parameter, the second node sets, by default, the accumulated value of the dynamic power control to a protocol-specified default value or a configured default value.

2. The Following Describes the Configured Power Control Parameter in the First Power Control Parameter.

Herein, the configured power control parameter in the first power control parameter is described by using an example in which the uplink channel is the PUSCH.

(1). The uplink channel or uplink signal-reference power and path loss parameter set index is a P0-PUSCH-AlphaSetID. The first power control parameter includes one or more P0-PUSCH-AlphaSetIDs. Each P0-PUSCH-AlphaSet includes one P0-PUSCH-AlphaSetID, the value of the subscriber-level nominal power, and the path loss compensation factor (namely, a value of Alpha), and is specifically expressed as follows:

```
P0-PUSCH-AlphaSet ::=      SEQUENCE{
   p0-PUSCH-AlphaSetId       P0-PUSCH-AlphaSetId,
   p0                        INTEGER (-16..15)
   alpha                     Alpha}
```

It can be learned from the composition of the foregoing P0-PUSCH-AlphaSet that the P0-PUSCH-AlphaSet includes the value of the subscriber-level nominal power and the path loss compensation factor.

Therefore, optionally, the value of the subscriber-level nominal power and the path loss compensation factor that are carried in the first power control parameter are indirectly represented by the P0-PUSCH-AlphaSetIDs. In other words, the value of the subscriber-level nominal power and a value of the path loss compensation factor may be carried by using the P0-PUSCH-AlphaSet.

(2). The uplink channel or uplink signal-path loss reference signal configuration is a PUSCH-PathlossReferenceRS configuration, and the first power control parameter includes one or more PUSCH-PathlossReferenceRS configurations. Each PUSCH-PathlossReferenceRS includes a PUSCH-PathlossReferenceRS ID, a CSI-RS resourceID, or an SS/PBCH index, and is specifically expressed as follows:

```
PUSCH-PathlossReferenceRS-r16 ::=   SEQUENCE{
   PUSCH-PathlossReferenceRS-         PUSCH-PathlossReferenceRS-
   Id-r16                             Id-r16,
      referenceSignal-r16             CHOICE{
         ssb-Index-r16                   SSB-Index,
         csi-RS-Index-r16                NZP-CSI-RS-ResourceId
      }
}
```

It can be learned from the composition of the foregoing PUSCH-PathlossReferenceRS that the PUSCH-PathlossReferenceRS includes the PUSCH-PathlossReferenceRS ID.

Therefore, optionally, the path loss measurement reference signal index carried in the first power control parameter is represented by the PUSCH-PathlossReferenceRS configuration. In other words, the path loss measurement reference signal index may be carried by using the PUSCH-PathlossReferenceRS configuration.

(3). The uplink channel or uplink signal-sounding resource index-power control parameter configuration is a sounding resource index physical uplink shared channel power control (sounding resource index physical uplink shared channel power control, SRI-PUSCH-PowerControl) configuration, and the first power control parameter includes one or more PUSCH-PowerControl configurations. Each SRI-PUSCH-PowerControl includes an SRI-PUSCH-PowerControl ID, an sri-PUSCH-PathlossReferenceRS-Id, an sri-P0-PUSCH-AlphaSetId, and an sri-PUSCH-ClosedLoop-Index, and is specifically expressed as follows:

```
SRI-PUSCH-PowerControl ::=   SEQUENCE{
   sri-PUSCH-PowerControlId        SRI-PUSCH-PowerControlId,
   sri-PUSCH-PathlossReferenceRS-Id  PUSCH-PathlossReferenceRS-Id,
   sri-P0-PUSCH-AlphaSetId         P0-PUSCH-AlphaSetId,
   sri-PUSCH-ClosedLoopIndex       ENUMERATED{ i0,i1 }
}
```

(4). The reference power-uplink channel or uplink signal configuration set configuration is a P0-PUSCH-Set configuration, and the first power control parameter includes one or more P0-PUSCH-Set configurations. Each P0-PUSCH-Set includes an P0-PUSCH-SetID and the value of the subscriber-level nominal power $P_{O\_UE\_PUSCH}$, and is specifically expressed as follows:

```
P0-PUSCH-Set-r16 ::=   SEQUENCE{
   p0-PUSCH-SetId-r16        P0-PUSCH-SetId-r16
   p0-List-r16               SEQUENCE(size(1..maxNrof P0-
PUSCH-SetId-r16))OF P0-PUSCH-r16
   ...
}
P0-PUSCH-SetId-r16 ::=   INTEGER(1..maxNrofSRI-PUSCH-Mappings-
                         1)
P0-PUSCH-r16 ::=         INTEGER(-16..15)
```

3. The Following Separately Describes the Newly Defined Power Control Parameter Carried in the First Power Control Parameter.

a. First Upper Limit.

The first upper limit is an upper limit of transmit power used by the first node in the first transmission mode.

In the first transmission mode, when transmit power determined by the first node by using a power control parameter in the first transmission mode is greater than the first upper limit, transmission is performed based on the first upper limit. If the first upper limit is not configured, the first node performs transmission by using an upper limit of transmit power in the TDM mode.

For example, an upper limit of transmit power corresponding to space-division multiplexing transmission is $P_{CMAX,SDM}$, and an upper limit of transmit power corresponding to full-duplex transmission is $P_{CMAX,FD}$.

b. First Lower Limit.

The first lower limit is a lower limit of transmit power used by the first node in the first transmission mode.

In the first transmission mode, when the transmit power determined by the first node by using the power control parameter in the first transmission mode is less than the first lower limit, transmission is performed based on the first lower limit.

c. Value Range of the Difference Between the First Upper Limit and the First Lower Limit The value range of the difference between the first upper limit and the first lower limit is used to indicate a value range of the transmit power used by the first node in the first transmission mode.

In a possible implementation, the first power control parameter is further used to indicate second transmit power expected by the first node in a second transmission mode.

In the possible implementation, the first node requests, by using a same power control parameter (for example, the first power control parameter), the first transmit power expected in the first transmission mode and the second transmit power expected in the second transmission mode.

The first transmission mode and the second transmission mode include any one of the following possible implementations.

1. The transmit power expected in the first transmission mode is used for space-division multiplexing transmission, and the transmit power expected in the second transmission mode is used for full-duplex transmission.
2. The transmit power expected in the first transmission mode is used for full-duplex transmission, and the transmit power expected in the second transmission mode is used for space-division multiplexing transmission.

A specific application scenario may be understood with reference to the specific application scenarios shown in FIG. 2(*a*) and FIG. 2(*b*).

Step 302: The first node sends a first message to a second node.

The first message carries the first power control parameter, and the first message is used to request the first transmit power expected by the first node in the first transmission mode.

The following describes a relationship between the first node and the second node with reference to a specific application scenario.

Relationship 1: The first node is an IAB node, and the second node is a donor base station.

In Relationship 1, two possible application scenarios are specifically included. The following provides descriptions with reference to FIG. 1B.

A first application scenario is that the first node is the IAB node 2, and the second node is the donor base station.

A second application scenario is that the first node is the IAB node 1, and the second node is the donor base station.

Relationship 2: Both the first node and the second node are IAB nodes, and the second node is an upper-level node of the first node.

For example, as shown in FIG. 1B, the first node is the IAB node 1, the second node is the IAB node 2, and the IAB node 2 is an upper-level node of the IAB node 1.

In this embodiment, the first message is carried in radio resource control RRC signaling, or a media access control control element MAC CE, or uplink control information UCI, or backhaul adaption protocol BAP signaling, or F1 interface application protocol signaling.

In this embodiment, because the second node is the upper-level node of the first node, the first transmit power may be understood as uplink transmit power when the first node performs transmission to the second node in the first transmission mode.

In a possible implementation, when the first power control parameter is further used to request the second transmit power expected by the first node in the second transmission mode, the first message is further used to request the second transmit power expected by the first node in the second transmission mode.

In the possible implementation, the first node requests, by using a same power control parameter, the first transmit power expected by the first node in the first transmission mode and the second transmit power expected by the first node in the second transmission mode, so that the second node separately configures a power control parameter in the first transmission mode and a power control parameter in the second transmission mode.

In another possible implementation, the first message further carries a second power control parameter, and the second power control parameter is used to indicate the second transmit power expected by the first node in the second transmission mode. In this case, the first message is further used to request the second transmit power expected by the first node in the second transmission mode.

In the possible implementation, content of the second power control parameter is similar to content of the first power control parameter in Step 301. Details are not described herein again. The first node carries, in one request, the first power control parameter and the second power control parameter, to implement reporting of the power control parameters in the two different transmission modes, so that the second node separately configures the power control parameter in the first transmission mode and the power control parameter in the second transmission mode.

Optionally, the second power control parameter is partially the same as or completely different from the first power control parameter.

For example, the first power control parameter corresponds to space-division multiplexing transmission, and the second power control parameter corresponds to full-duplex transmission. If the first power control parameter includes a value A1 of the reference power and a path loss compensation factor B1, and the second power control parameter includes a value A2 of the reference power and the path loss compensation factor B1, it can be learned that the first power control parameter is partially the same as the second power control parameter.

In this embodiment of this application, the first node reports, to the second node, the first power control parameter expected in the first transmission mode, so that the second node configures the power control parameter in the first transmission mode for the first node. In addition, when reporting the first power control parameter to the second node, the first node associates a transmission mode with a reported power control parameter. This helps alleviate a problem, for example, a transmission capacity decrease, caused by interference or the like, and improve transmission performance. For example, in space-division multiplexing transmission, the first node performs transmission to the second node by using transmit power determined by the first power control parameter, to effectively alleviate the transmission capacity decrease caused by the interference, and improve transmission performance.

In this embodiment, to distinguish between a transmission mode corresponding to the first power control parameter reported by the first node, this embodiment of this application provides a plurality of implementations. The following separately describes the implementations.

Implementation 1: The first message further includes first indication information.

The first indication information is used to indicate the first transmission mode, and the first power control parameter corresponds to the first transmission mode. The first indication information includes a plurality of possible implementations. The following provides descriptions by using examples.

1. The First Indication Information Includes First Uplink Sending Timing Information.

The first uplink sending timing information is associated with the first transmission mode. Therefore, when the first indication information includes the first uplink sending timing information, the first power control parameter corresponds to the first transmission mode.

Optionally, the first uplink sending timing information indirectly (implicitly) or directly (explicitly) indicates that the first power control parameter corresponds to the first transmission mode. Details are separately described below.

First, it is described that the first uplink sending timing information indirectly (implicitly) indicates that the first power control parameter corresponds to the first transmission mode.

a. The first uplink sending timing information includes an ID of a timing advance group (timing advance group, TAG) corresponding to the first transmission mode.

Optionally, the transmission mode is associated with uplink sending timing, the uplink sending timing is related to the TAG, and each TAG corresponds to one ID. In this case, the second node may determine, by using the ID of the TAG included in the first uplink sending timing information, the transmission mode corresponding to the first power control parameter. For example, if the first uplink sending timing information includes the ID of the TAG corresponding to the first transmission mode, it can be learned that the first power control parameter corresponds to the first transmission mode. When the first uplink sending timing information includes an ID of a TAG corresponding to the second transmission mode, it is indicated that the first power control parameter corresponds to the second transmission mode.

b. The First Uplink Sending Timing Information is an Identifier.

Because dedicated uplink sending timing may not need to be configured for full-duplex transmission, when the first message includes uplink sending timing information, the first power control parameter corresponds to space-division multiplexing transmission. When the first power control parameter does not include uplink sending timing information, the first power control parameter corresponds to a full-duplex transmission mode.

c. The First Uplink Sending Timing Information Includes a Value of Timing Advance (Timing Advance, TA) Corresponding to the First Transmission Mode.

Optionally, the transmission mode is associated with uplink sending timing, and the uplink sending timing is represented by the value of the TA. In this case, the second node may determine, by using a value of the uplink sending timing, the transmission mode corresponding to the first power control parameter. For example, if the first uplink sending timing information includes the value of the TA corresponding to the first transmission mode, it can be learned that the first power control parameter corresponds to the first transmission mode.

The following describes that the first uplink sending timing information directly (explicitly) indicates that the first power control parameter corresponds to the first transmission mode.

For example, the first uplink sending timing information includes a second bit, and a value of the second bit is used to indicate the transmission mode corresponding to the first power control parameter. For example, if the value of the second bit is "1", it is represented that the first transmission mode corresponding to the first power control parameter. If the value of the second bit is "0", it is represented that the first power control parameter corresponds to the second transmission mode.

2. The First Indication Information Includes an Index Value.

The index value is a first preset value, the first preset value is used to indicate the first transmission mode, and the first power control parameter corresponds to the first transmission mode. The following shows a correspondence between an index value and a power control parameter by using Table 1.

TABLE 1

| Index value | Power control parameter |
|---|---|
| 00 | First power control parameter in the first transmission mode |
| 01 | Second power control parameter in the second transmission mode |

For example, when the index value is "00", it is indicated that the first power control parameter corresponds to the first transmission mode.

It should be noted that, when the first node sends, to the second node, a request message carrying the second power control parameter, an index value carried by the first node in the request message is a second preset value, and the second preset value is used to indicate the second transmission mode. The second power control parameter is used to request the second transmit power expected by the first node in the second transmission mode. For example, when a field in the request message is "0", it is indicated that the second power control parameter corresponds to the second transmission mode.

Implementation 2: An information element name of the first message is used to indicate a transmission mode corresponding to the first power control parameter.

The information element name of the first message is a first information element name, and the first information element name is used to indicate that the first power control parameter corresponds to the first transmission mode. For example, when the first information element name is SDM power control, the first power control parameter corresponds to space-division multiplexing transmission. When the first information element name is FD power control, the first power control parameter corresponds to full-duplex transmission.

Implementation 2 merely shows that the transmission mode corresponding to the first power control parameter is indicated by using the information element name of the first message. However, in actual application, the transmission mode corresponding to the first power control parameter may be alternatively indicated by using other attribute information of the first message, for example, an information element format of the first message and a quantity of sending times of the first message.

In this embodiment of this application, for the first message sent by the first node, there are a plurality of feedback manners of the second node. The following separately describes the feedback manners.

Feedback manner 1: The second node feeds back positive acknowledgment information or negative acknowledgment information to the first node.

In Feedback manner 1, the embodiment shown in FIG. 3A further includes Step 303a and Step 304a, and Step 303a and Step 304a are performed after Step 302.

Step 303a: If the first node receives the positive acknowledgment information sent by the second node, the first node performs transmission in the first transmission mode by using the first transmit power determined by the first power control parameter.

It should be understood that a formula for determining the first transmit power is as follows:

$$P_{PUSCH,b,f,c}(i, j, q_d, l) =$$
$$\min \left\{ \begin{array}{l} P_{CMAX,f,c}(i), \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

For meanings of the foregoing parameters, refer to the foregoing descriptions. Details are not described herein again.

The first node calculates the first transmit power based on the first power control parameter and the foregoing formula.

The positive acknowledgment information is used to indicate that the first node is allowed to perform transmission at the first transmit power determined by the first power control parameter. Optionally, the positive acknowledgment information is ACK.

Figure 3B:
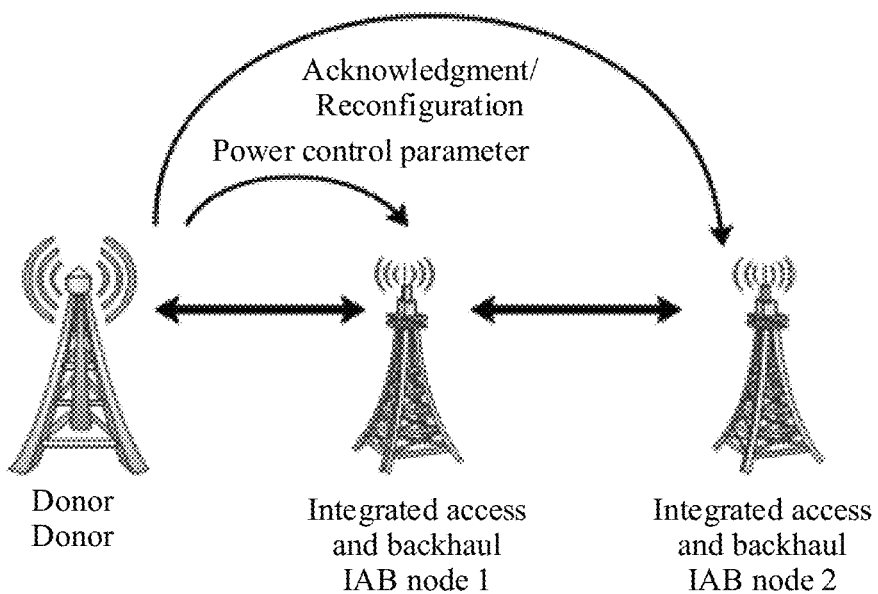
FIG. 3B is a schematic diagram of a scenario of a power control method according to an embodiment of this application.

For example, as shown in FIG. 3B, the second node is a donor base station, and the first node is an IAB node 1. The donor base station sends positive acknowledgment information to the IAB node 1.

Step 304a: If the first node receives the negative acknowledgment information sent by the second node, the first node performs transmission in the first transmission mode by using third transmit power determined by a power control parameter in the TDM mode.

Similarly, a formula for determining the third transmit power is as follows:

$$P_{PUSCH,b,f,c}(i, j, q_d, l) =$$
$$\min \left\{ \begin{array}{l} P_{CMAX,f,c}(i), \\ P_{O\_PUSCH,b,f,c}(j) + 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{array} \right\}$$

The first node calculates the third transmit power based on the power control parameter in the TDM mode and the foregoing formula.

The negative acknowledgment information is used to indicate that the first node is not allowed to perform transmission at the first transmit power determined by the first power control parameter. Optionally, the negative acknowledgment information is NACK.

In Step 304a, if the second node rejects the first node to perform transmission at the first transmit power determined by the first power control parameter, the first node may perform transmission by using transmit power of the configured power control parameter in the TDM mode. A mechanism in Step 304a is specified by the communication protocol, or is determined by the first node.

Feedback manner 2: The second node feeds back only negative acknowledgment information.

In Feedback manner 2, the embodiment shown in FIG. 3A further includes Step 303b and Step 304b, and Step 303b and Step 304b are performed after Step 302.

Step 303b: If the first node does not receive the negative acknowledgment information sent by the second node, the first node performs transmission in the first transmission mode by using the first transmit power determined by the first power control parameter. For a formula for calculating the first transmit power, refer to Step 303a.

When the second node allows the first node to perform transmission in the first transmission mode by using the first power control parameter determined by the first power control parameter, the second node does not feed back any message to the first node.

Step 304b: If the first node receives the negative acknowledgment information sent by the second node, the first node performs transmission in the first transmission mode by using third transmit power determined by a power control parameter in the TDM mode. For a formula for calculating the third transmit power, refer to Step 304a.

In Step 304b, if the second node rejects the first node to perform transmission at the first transmit power determined by the first power control parameter, the first node may perform transmission by using transmit power of the configured power control parameter in the TDM mode. Optionally, the negative acknowledgment information is NACK.

In this embodiment, a mechanism in Step 304b is specified by the communication protocol, or is determined by the first node.

Feedback manner 3: The second node feeds back only positive acknowledgment information.

In Feedback manner 3, the embodiment shown in FIG. 3A further includes Step 303c and Step 304c, and Step 303c and Step 304c are performed after Step 302.

Step 303c: If the first node receives the positive acknowledgment information sent by the second node, the first node performs transmission in the first transmission mode by using the first transmit power determined by the first power control parameter. For a formula for calculating the first transmit power, refer to Step 303a.

When the second node allows the first node to perform transmission in the first transmission mode by using the first power control parameter determined by the first power control parameter, the second node sends the positive acknowledgment information to the first node. Optionally, the positive acknowledgment information is ACK.

Step 304c: If the first node does not receive the positive acknowledgment information sent by the second node, the first node performs transmission in the first transmission mode by using third transmit power determined by a power control parameter in the TDM mode. For a formula for calculating the third transmit power, refer to Step 304a.

In Step 304c, if the second node rejects the first node to perform transmission at the first transmit power determined by the first power control parameter, the first node may perform transmission by using transmit power of the configured power control parameter in the TDM mode. A mechanism in Step 304c is specified by the communication protocol, or is determined by the first node.

Feedback manner 4: The second node feeds back a reconfiguration message to the first node.

In Manner 4, the embodiment shown in FIG. 3A further includes Step 303d and Step 304d, and Step 303d and Step 304d are performed after Step 302.

Step 303d: The second node sends the reconfiguration message to the first node.

The reconfiguration message carries a third power control parameter. The third power control parameter is a power control parameter that is configured by the second node for the first node and that is used for the first transmission mode. The first power control parameter is partially or completely the same as the third power control parameter.

For example, as shown in FIG. 3B, the second node is the donor base station, and the first node is the IAB node 1. The donor base station sends a reconfiguration message to the IAB node 1.

The following describes a relationship between the first power control parameter and the third power control parameter with reference to a manner in which the second node reconfigures the third power control parameter for the first node.

Manner a: The second node reserves configurations of some power control parameters of the first power control parameter reported by the first node, and modifies configurations of the other power control parameters of the first power control parameter.

Optionally, in Manner a, the second node feeds back only modified power control parameters in the first power control parameter, and includes the modified power control parameters in the reconfiguration message. For a power control parameter that is not included in the reconfiguration message, after receiving the reconfiguration message, the first node may consider by default that the second node does not modify the power control parameter that is not included in the reconfiguration message.

For example, the first node reports the value of the reference power and the value of the path loss compensation factor. The second node continues to use the value of the reference power, modifies the value of the path loss compensation factor, and then uses the value of the reference power and a modified value of the path loss compensation factor as the second power control parameter.

In this embodiment, in Manner a, there are a plurality of reasons for modifying a configuration of the first power control parameter by the second node. For example, the first power control parameter reported by the first node may cause inter-UE interference or inter-cell interference.

Manner b: The second node adds a configuration of another power control parameter based on the first power control parameter.

For example, the first node reports only the value of the reference power or the value range of the reference power, and the second node adds configurations of the path loss compensation factor and a path loss measurement parameter signal to the reconfiguration message. In other words, the first power control parameter includes only the value of the reference power, and the second power control parameter includes the value of the reference power, the path loss compensation factor, and the path loss measurement parameter signal.

In this embodiment, in Manner b, there are a plurality of reasons for adding a configuration of the first power control parameter by the second node. For example, the second node considers that adding configurations of the other power control parameters can increase predictability of the uplink transmit power of the first node, and improve transmission performance of the first node.

Step 304d: The first node performs transmission in the first transmission mode by using transmit power determined by the third power control parameter.

In this embodiment of this application, optionally, after the second node feeds back the first message, the embodiment shown in FIG. 3A further includes Step 305 and Step 306.

Step 305: When a first condition is met, the first node performs transmission by using first transmit power determined by a power control parameter corresponding to the first transmission mode.

The first condition includes any one of the following.

1. The First Node Receives Second Indication Information Sent by a Third Node.

The second indication information is used to indicate the first node to perform transmission by using transmit power determined by the power control parameter corresponding to the first transmission mode. The third node is an upper-level node of the first node or a donor base station.

The following describes a relationship between the second node and the third node with reference to an application scenario shown in FIG. 3B.

A first application scenario is that the first node is the IAB node 1, and the second node is the donor base station. In this application scenario, the third node and the second node are a same device, namely, the donor base station.

In the first application scenario, the donor base station sends the second indication information to the IAB node 1.

A second application scenario is that the first node is the IAB node 2, and the second node is the donor base station. In this application scenario, the third node is the IAB node 1, the IAB node 1 is a lower-level node of the donor base station, and the IAB node 1 is an upper-level node of the IAB node 2.

A third application scenario is that the first node is the IAB node 2, the second node and the third node are a same device, namely, the IAB node 1, and the IAB node 2 is an upper-level node of the IAB node 1.

In the second application scenario and the third application scenario, the third node is the IAB node 2, and specifically, an IAB DU in the IAB node 2 may send the second indication information to the IAB node 1.

2. The First Node Receives a First Uplink Sending Timing Indication Sent by the Second Node.

First uplink sending timing indicated by the first uplink sending timing indication is associated with the first transmission mode.

For example, for a space-division transmission mode, uplink sending timing different from uplink sending timing of a time-division transmission mode is defined in the communication protocol, and the uplink sending timing is associated with the transmission mode, to indirectly implement a correspondence between the transmission mode and a transmit power parameter.

For example, different timing advances (TAs) or timing advance groups (TAGs) are configured for different transmission modes, to distinguish between a plurality of transmission modes by using IDs of the TAs or IDs of the TAGs. Alternatively, a plurality of transmission modes are distinguished by using signaling. Alternatively, transmission parameter sets are defined for different transmission modes, to distinguish between a plurality of transmission modes by using the transmission parameter sets. Alternatively, or bandwidth part (bandwidth part, BWP) configurations are configured for different transmission modes, to distinguish between a plurality of transmission modes by using the BWP configurations. The transmission parameter set or the BWP configuration includes uplink sending timing information.

3. The First Node Determines, Based on a Current Transmission Frame Structure of the First Node, that a Current Transmission Mode of the First Node is the First Transmission Mode.

Example 1: The first node is an IAB node, and an IAB MT of the IAB node transmits an uplink signal to an upper-level node at a same moment, and receives, at the same moment, an uplink signal sent by a lower-level node. To be specific, if both the IAB MT and an IAB DU are scheduled to constitute uplink full-duplex transmission, the IAB node may determine that the current transmission mode is a full-duplex transmission mode.

Example 2: An IAB DU of an IAB node is configured as a hard UL resource type on a time resource. The hard UL resource type is a resource type already defined in the 3GPP standard protocol. The IAB DU may receive an uplink signal on the hard UL resource type, and a behavior of an IAB MT of the IAB node does not affect uplink receiving of the IAB DU. To be specific, for an IAB node having a full-duplex capability, in this case, an upper-level node of the IAB node may still schedule the IAB MT to perform uplink sending. When a scheduling result of the IAB MT and the resource type of the IAB DU constitute a state in which sending and receiving are simultaneously performed, the IAB node may determine that the current transmission mode is of full-duplex transmission, and the IAB node sends a signal by using transmit power determined by a power control parameter for full-duplex transmission.

The technical solutions in embodiments of this application are not limited to the resource type in the foregoing example. Because another resource type and transmission direction are further defined in the standard, provided that the IAB MT and the IAB DU constitute full-duplex transmission in general sense, transmit power of the IAB node in full-duplex transmission may be determined according to the power control method provided in this embodiment of this application.

Example 3: An IAB DU of an IAB node is configured as a hard DL resource type on a time resource. The hard DL resource type is a resource type already defined in the 3GPP standard protocol. The IAB DU may send a downlink signal on the hard DL resource type, and according to a definition in the NR protocol of a Release-16 version, in this case, a behavior of an IAB MT of the IAB node does not affect downlink sending of the IAB DU. For an IAB node that supports space-division transmission, if an upper-level node of the IAB node schedules the IAB MT to perform uplink sending in this case, a working mode of the space-division transmission is constituted at the IAB node. In this case, the IAB node may determine that the current transmission mode is space-division multiplexing transmission, and send a signal by using transmit power determined by a power control parameter for space-division multiplexing transmission.

The technical solutions in embodiments of this application are not limited to the resource type in the foregoing example. Because another resource type and transmission direction are further defined in the standard, provided that the IAB MT and the IAB DU constitute space-division multiplexing transmission in general sense, transmit power of the IAB node in space-division multiplexing transmission may be determined according to the power control method provided in this embodiment of this application.

Step 306: When a second condition is met, the first node performs transmission by using second transmit power determined by a power control parameter corresponding to the second transmission mode.

The second condition includes any one of the following.

1. The First Node Receives Third Indication Information Sent by a Third Node.

The third indication information is used to indicate the first node to perform transmission by using transmit power determined by the power control parameter corresponding to the second transmission mode.

2. The First Node Receives a Second Uplink Sending Timing Indication Sent by the Second Node.

Second uplink sending timing indicated by the second uplink sending timing indication is associated with the second transmission mode.

3. The First Node Determines, Based on a Current Transmission Frame Structure of the First Node, that a Current Transmission Mode of the First Node is the Second Transmission Mode.

Step 306 is similar to Step 305. For details, refer to related descriptions of Step 305. Details are not described herein again.

In this embodiment of this application, to enable the first node to perform transmission in the first transmission mode by using the transmit power determined by the first power control parameter, any one of the following provisions may be added to the communication protocol:

Regulation 1: When the first node performs transmission in the first transmission mode by using the first transmit power, an upper-level node of the first node does not send a dynamic power control indication to the first node.

Regulation 2: The first node does not expect to receive the dynamic power control indication sent by the upper-level node of the first node.

Regulation 3: When the first node receives the dynamic power control indication that is sent by the upper-level node of the first node and that is for the first transmission mode, the first node ignores or does not apply a power control parameter indicated by the dynamic power control indication.

Optionally, the dynamic power control indication in 1 to 3 includes an uplink power control indication carried by downlink control information (downlink control indication, DCI), for example, an SRI indication, a closed-loop power control parameter set indication, or a transmission power control (transmission power control, TPC) indication carried in a DCI format 2_2 or 2_3.

In this embodiment of this application, optionally, the embodiment shown in FIG. 3A further includes Step 307, and Step 307 is performed after Step 302.

Step 307: The second node sends, to a fourth node, the power control parameter corresponding to the first transmission mode.

The power control parameter corresponding to the first transmission mode is used by the fourth node to perform transmission in the first transmission mode by using the transmit power determined by the power control parameter corresponding to the first transmission mode. Specifically, the second node may send, to the fourth node by using F1 signaling, the power control parameter corresponding to the first transmission mode.

The fourth node is an upper-level node of the first node or a donor base station.

The following describes a relationship between the second node and the fourth node with reference to the application scenario shown in FIG. 3B.

Scenario 1: The first node is the IAB node 2, and the second node is the donor base station. In Scenario 1, the fourth node is the IAB node 1, the IAB node 1 is a lower-level node of the donor base station, and the IAB node 2 is an upper-level node of the IAB node 1.

For example, as shown in FIG. 3B, the donor base station sends, to the IAB node 1, the power control parameter corresponding to the first transmission mode.

Scenario 2: The first node is the IAB node 2, and the second node is the IAB node 1. In this case, in Scenario 2, the fourth node is the donor base station, and the IAB node 2 is an upper-level node of the IAB node 1.

Figure 3C:
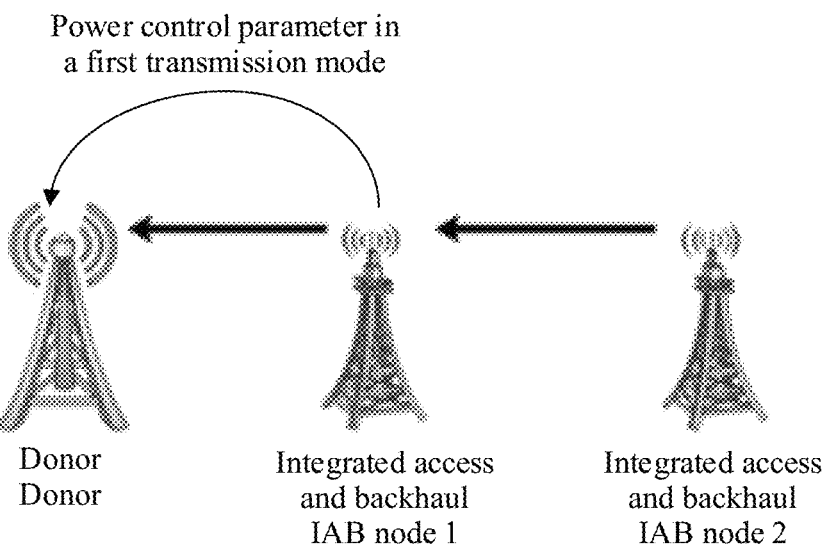
FIG. 3C is a schematic diagram of another scenario of a power control method according to an embodiment of this application.

For example, as shown in FIG. 3C, an IAB node 1 sends a power control parameter corresponding to the first transmission mode to a donor base station.

In this embodiment of this application, FIG. 3A shows a manner in which the first node reports the first power control parameter to the second node, so that the second node configures the power control parameter in the first transmission mode for the first node. In actual application, this embodiment of this application further provides the following two possible implementations.

Implementation 1: The first node may send fifth indication information to the second node.

The fifth indication information is used to indicate the second node to adjust transmit power of the first node in the first transmission mode, or the fifth indication information is used to indicate the second node to increase or decrease the transmit power of the first node in the first transmission mode, so that the second node configures the power control parameter in the first transmission mode for the first node.

Optionally, the fifth indication information is further used to indicate the second node to adjust transmit power of the first node in the second transmission mode. Alternatively, the fifth indication information is further used to indicate the second node to increase or decrease the transmit power of the first node in the second transmission mode.

The first transmission mode and the second transmission mode include any one of the following possible implementations.

1. The transmit power expected in the first transmission mode is used for space-division multiplexing transmission, and the transmit power expected in the second transmission mode is used for full-duplex transmission; and
2. The transmit power expected in the first transmission mode is used for full-duplex transmission, and the transmit power expected in the second transmission mode is used for space-division multiplexing transmission.

Implementation 2: The second node may send a reconfiguration message to the first node.

The reconfiguration message carries the power control parameter that is configured by the second node for the first node and that is used for the first transmission mode, so that the second node configures the power control parameter in the first transmission mode for the first node.

FIG. 4 is a schematic diagram of another embodiment of a power control method according to an embodiment of this application. In FIG. 4, the method includes the following steps.

Step 401: A first node sends a second message to a second node.

For the first node, the second message is used to request first receive power expected by the first node in a first transmission mode. For the second node, the second message is used to request fourth transmit power expected by the second node when the second node performs transmission to the first node in the first transmission mode.

In this embodiment, the second node is an upper-level node of the first node or a donor base station. For a specific relationship between the first node and the second node, refer to the detailed description of Step 302 in the embodiment shown in FIG. 3A. Details are not described herein again.

In this embodiment, because the second node is the upper-level node of the first node, the first receive power may be understood as downlink receive power expected by the first node for receiving a signal sent by the second node. The fourth transmit power may be understood as downlink transmit power that is expected by the first node and at which the second node sends a signal to the first node.

Optionally, there are a plurality of possible implementations in which the first node requests the first receive power from the second node. The following provides descriptions with reference to a specific form of the second message.

Manner 1: The second message is a receive power request message.

The receive power request message includes a first offset value and/or a power scaling factor.

The first offset value is an offset value relative to receive power or transmit power of any one or more of a DMRS, a SS/PBCH, and a CSI-RS. The power scaling factor is multiplied by the receive power or the transmit power of any one or more of the DMRS, the SS/PBCH, and the CSI-RS, to obtain the first receive power.

In this embodiment, the first receive power expected by the first node should be receive power that can alleviate interference caused by a receiver of the first node. Therefore, a value of the first offset value and a value of the power scaling factor should be determined with reference to an interference problem of the first node, so that the second node adjusts third transmit power used when the second node performs transmission to the first node, to resolve the interference problem of the first node.

Manner 2: The second message is a receive power adjustment request message.

Content carried in the receive power adjustment request message has a plurality of forms, which are separately described below.

1. The Receive Power Adjustment Request Message Carries Fourth Indication Information.

The fourth indication information is used to indicate to trigger the second node to adjust the third transmit power. Alternatively, the fourth indication information is used to indicate the second node to increase or decrease the third transmit power.

It can be learned from the foregoing fourth indication information that the first node may indicate, by using the fourth indication information, the second node to adjust the third transmit power. Alternatively, the first node may indicate, by using the fourth indication information, a specific power adjustment manner for the second node. For example, the fourth indication information indicates the second node to increase or decrease the third transmit power.

2. The Receive Power Adjustment Request Message Carries a First Adjustment Value.

The first adjustment value is used by the second node to adjust the third transmit power. For example, if the first adjustment value is 10 dB, the second node increases the third transmit power by 10 dB to obtain the fourth transmit power, and uses the fourth transmit power as transmit power used when the second node performs transmission to the first node.

3. The Receive Power Adjustment Request Message Carries a First Bit.

The first bit corresponds to a first adjustment value, and the first adjustment value is used by the second node to adjust the third transmit power. A correspondence exists between a bit carried in the receive power adjustment request message and an adjustment value, and is shown in Table 2:

TABLE 2

| Bit carried in the receive power adjustment request message | Adjustment value |
|---|---|
| 00 | 10 dB |
| 01 | −10 dB |

For example, the first bit is "00", and "00" corresponds to an adjustment value of 10 dB. In this case, the second node increases the third transmit power by 10 dB to obtain the fourth transmit power, and uses the fourth transmit power as the transmit power used when the second node performs transmission to the first node.

In this embodiment, the receive power adjustment request message is carried in a MAC CE, UCI, or RRC signaling.

Optionally, the second message is further used to request second receive power expected by the first node in a second transmission mode. To be specific, the first node requests, by using one request message, configuration of the first receive power in the first transmission mode and the second receive power in the second transmission mode.

The first transmission mode and the second transmission mode include any of the following possible implementations.

1. Receive power expected in the first transmission mode is used for space-division multiplexing transmission, and receive power expected in the second transmission mode is used for full-duplex transmission.
2. Receive power expected in the first transmission mode is used for full-duplex transmission, and receive power expected in the second transmission mode is used for space-division multiplexing transmission.

A specific application scenario of the embodiment shown in FIG. 4 may be understood with reference to the foregoing FIG. 2(c) and FIG. 2(d).

In this embodiment, optionally, the embodiment shown in FIG. 4 further includes Step 402 and Step 403, and Step 402 and Step 403 are performed after Step 401.

Step 402: The second node sends first acknowledgment information to the first node.

The first acknowledgment information is used to notify the first node that the second node has received the first acknowledgment information.

Specifically, when the second node is the donor base station and the first node is the IAB node, generally, downlink transmit power at which the donor base station performs transmission to the IAB node is an implementation behavior of a donor base station side. Therefore, when receiving the second message, the donor base station may still send a downlink signal to the IAB node based on downlink transmit power determined by an implementation algorithm of the donor base station. In this case, after feeding back the first acknowledgment information to the IAB node, the donor base station does not necessarily adjust the downlink transmit power at which the donor base station performs transmission to the IAB node. Alternatively, the donor base station does not feed back any information to the IAB node.

Step 403: The first node determines, based on the first acknowledgment information, that the second node has received the second message.

In this embodiment of this application, the first node sends the second message to the second node, the second message is used to request the first receive power expected by the first node in the first transmission mode, and the second node is the upper-level node of the first node or the donor base station. It can be learned that, for the first transmission mode, the first node may request, from the second node, the first receive power expected in the first transmission mode, so that the second node adjusts the third transmit power used when the second node performs transmission to the first node, to alleviate a transmission capacity decrease caused by the interference, and improve transmission performance.

Figure 5:
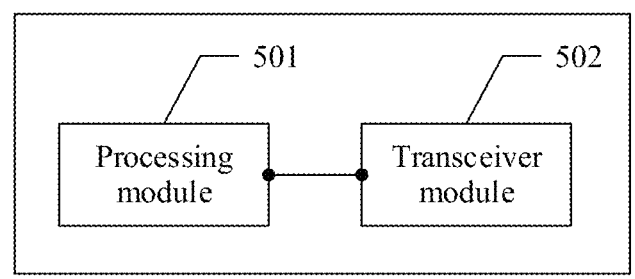
FIG. 5 is a schematic diagram of a structure of a power control apparatus according to an embodiment of this application.

The following describes a power control apparatus provided in an embodiment of this application. FIG. 5 is a schematic diagram of a structure of the power control apparatus according to this embodiment of this application. The power control apparatus may be a first node. The power control apparatus may be configured to perform a step performed by the first node in the embodiment shown in FIG. 3A. Refer to related descriptions in the foregoing method embodiment.

The power control apparatus includes a processing module 501 and a transceiver module 502.

The processing module 501 is configured to determine a first power control parameter. The first power control parameter is used to indicate first transmit power expected by the power control apparatus in a first transmission mode.

The transceiver module 502 is configured to send a first message to a second node. The first message carries the first power control parameter. The first message is used to request the first transmit power expected by the power control apparatus in the first transmission mode. The second node is an upper-level node of the power control apparatus or a donor base station.

In a possible implementation, the first message further carries a second power control parameter, and the second power control parameter is used to indicate second transmit power expected by the power control apparatus in a second transmission mode.

In another possible implementation, the first power control parameter is further used to indicate second transmit power expected by the power control apparatus in a second transmission mode.

In another possible implementation, the first power control parameter includes a value or a value range of reference power, a value or a value range of subscriber-level nominal power, or an offset value of reference power.

In another possible implementation, the value of the subscriber-level nominal power is represented by a P0-PUSCH-AlphaSetID.

In another possible implementation, the first power control parameter further includes a path loss compensation factor and/or a path loss measurement reference signal index.

In another possible implementation, the path loss compensation factor is represented by the P0-PUSCH-AlphaSetID, and the path loss measurement reference signal index is represented by a PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In another possible implementation, the first indication information includes first uplink sending timing information. The first uplink sending timing information is used to indicate the first transmission mode.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission.

In another possible implementation, the first message is carried in RRC signaling, a MAC CE, UCI, BAP signaling, or F1 interface application protocol signaling.

In another possible implementation, the transceiver module 502 is further configured to receive a reconfiguration message sent by the second node, where the reconfiguration message carries a third power control parameter, and the third power control parameter is a power control parameter that is configured by the second node for the power control apparatus and that is used for the first transmission mode.

The processing module 501 is further configured to perform transmission in the first transmission mode by using transmit power determined by the third power control parameter.

In another possible implementation, the first power control parameter is partially or completely the same as the third power control parameter.

In another possible implementation, the processing module 501 is further configured to when a first condition is met, perform transmission by using transmit power determined by a power control parameter corresponding to the first transmission mode, where the first condition includes any one of the following: the power control apparatus receives second indication information sent by a third node, where the second indication information is used to indicate the power control apparatus to perform transmission by using the transmit power determined by the power control parameter corresponding to the first transmission mode, and the third node is an upper-level node of the power control apparatus or a donor base station; the power control apparatus receives a first uplink sending timing indication sent by the second node, where the first uplink sending timing indication is associated with the first transmission mode; and the power control apparatus determines, based on a current transmission frame structure of the power control apparatus, that a current transmission mode of the power control apparatus is the first transmission mode; or when a second condition is met, perform transmission by using transmit power determined by a power control parameter corresponding to the second transmission mode, where the second condition includes any one of the following: the power control apparatus receives third indication information sent by a third node, where the third indication information is used to indicate the power control apparatus to perform transmission by using the transmit power determined by the power control parameter corresponding to the second transmission mode, and the third node is an upper-level node of the power control apparatus or a donor base station; the power control apparatus receives a second uplink sending timing indication sent by the second node, where the second uplink sending timing indication is associated with the second transmission mode; and the power control apparatus determines, based on a current transmission frame structure of the power control apparatus, that a current transmission mode of the power control apparatus is the second transmission mode.

Figure 6:
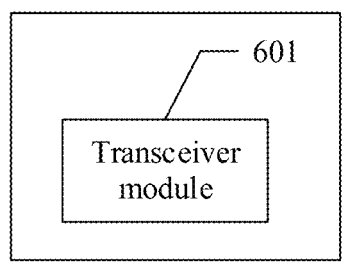
FIG. 6 is a schematic diagram of another structure of a power control apparatus according to an embodiment of this application.

The following describes a power control apparatus provided in an embodiment of this application. FIG. 6 is a schematic diagram of a structure of the power control apparatus according to this embodiment of this application. The power control apparatus may be a second node. The power control apparatus may be configured to perform a step performed by the second node in the embodiment shown in FIG. 3A. Refer to related descriptions in the foregoing method embodiment.

The power control apparatus includes a transceiver module 601.

The transceiver module 601 is configured to receive a first message sent by a first node. The first message carries a first power control parameter. The first power control parameter is used to indicate first transmit power expected by the first node in a first transmission mode. The first message is used to request the first transmit power expected by the first node in the first transmission mode. The power control apparatus is an upper-level node of the first node or a donor base station.

In a possible implementation, the first message further carries a second power control parameter, and the second power control parameter is used to indicate second transmit power expected by the first node in a second transmission mode.

In another possible implementation, the first power control parameter is further used to indicate second transmit power expected by the first node in a second transmission mode.

In another possible implementation, the first power control parameter includes a value or a value range of reference power, a value or a value range of subscriber-level nominal power, or an offset value of reference power.

In another possible implementation, the value of the subscriber-level nominal power is represented by a P0-PUSCH-AlphaSetID.

In another possible implementation, the first power control parameter further includes a path loss compensation factor and/or a path loss measurement reference signal index.

In another possible implementation, the path loss compensation factor is represented by the P0-PUSCH-AlphaSetID, and the path loss measurement reference signal index is represented by a PUSCH-PathlossReferenceRS configuration.

In another possible implementation, the first message further carries first indication information, and the first indication information is used to indicate a transmission mode corresponding to the first power control parameter. Alternatively, an information element name of the first message is used to indicate a transmission mode corresponding to the first power control parameter.

In another possible implementation, the first indication information includes first uplink sending timing information. The first uplink sending timing information is used to indicate the first transmission mode.

In another possible implementation, the first transmission mode is space-division multiplexing transmission, and the second transmission mode is full-duplex transmission. Alternatively, the first transmission mode is full-duplex transmission, and the second transmission mode is space-division multiplexing transmission.

In another possible implementation, the first message is carried in RRC signaling, a MAC CE, UCI, BAP signaling, or F1 interface application protocol signaling.

In another possible implementation, the transceiver module 601 is further configured to send a reconfiguration message to the first node, where the reconfiguration message carries a third power control parameter, and the third power control parameter is a power control parameter that is configured by the power control apparatus for the first node and that is used for the first transmission mode.

In another possible implementation, the first power control parameter is partially or completely the same as the third power control parameter.

In another possible implementation, the transceiver module 601 is further configured to send a power control parameter corresponding to the first transmission mode to a fourth node, where the fourth node is an upper-level node of the first node or a donor base station.

Figure 7:
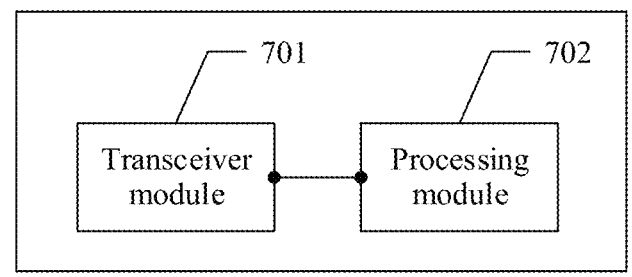
FIG. 7 is a schematic diagram of another structure of a power control apparatus according to an embodiment of this application.

The following describes a power control apparatus provided in an embodiment of this application. FIG. 7 is a schematic diagram of a structure of the power control apparatus according to this embodiment of this application. The power control apparatus may be a first node. The power control apparatus may be configured to perform a step performed by the first node in the embodiment shown in FIG. 4. Refer to related descriptions in the foregoing method embodiment.

The power control apparatus includes a transceiver module 701. Optionally, the power control apparatus further includes a processing module 702.

The transceiver module 701 is configured to send a second message to a second node. The second message is used to request first receive power expected by the power control apparatus in a first transmission mode. The second node is an upper-level node of the power control apparatus or a donor base station.

In a possible implementation, the second message is further used to request second receive power expected by the power control apparatus in a second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/physical broadcasting channel, and a channel state information reference signal. The power scaling factor is multiplied by the receive power or the transmit power of any one of the demodulation reference signal, the synchronization signal/physical broadcasting channel, and the channel state information reference signal, to obtain the first receive power.

In another possible implementation, the second message is a receive power adjustment request message. The receive power adjustment request message carries fourth indication information. The fourth indication information is used to indicate to trigger the second node to adjust third transmit power. The third transmit power is transmit power used when the second node performs transmission to the power control apparatus in the first transmission mode. Alternatively, the fourth indication information is used to indicate the second node to increase or decrease third transmit power.

In another possible implementation, the second message is a receive power adjustment request message. The receive power adjustment request message carries a first adjustment value. The first adjustment value is used by the second node to adjust third transmit power. The third transmit power is transmit power used when the second node performs transmission to the power control apparatus in the first transmission mode. Alternatively, the receive power adjustment request message carries a first bit, and the first bit corresponds to the first adjustment value.

In another possible implementation, the receive power adjustment request message is carried in a MAC CE, UCI, RRC, or other signaling.

In another possible implementation, the transceiver module 701 is further configured to receive first acknowledgment information sent by the second node.

The processing module 702 is configured to determine, based on the first acknowledgment information, that the second node has received the second message.

Figure 8:
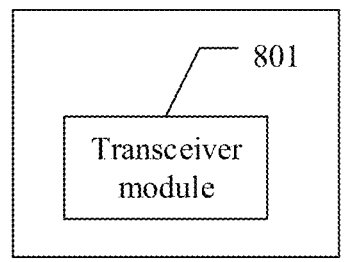
FIG. 8 is a schematic diagram of another structure of a power control apparatus according to an embodiment of this application.

The following describes a power control apparatus provided in an embodiment of this application. FIG. 8 is a schematic diagram of a structure of the power control apparatus according to this embodiment of this application. The power control apparatus may be a second node. The power control apparatus may be configured to perform a step performed by the second node in the embodiment shown in FIG. 4. Refer to related descriptions in the foregoing method embodiment.

The power control apparatus includes a transceiver module 801.

The transceiver module 801 is configured to receive a second message sent by a first node. The second message is used to request first receive power expected by the first node in a first transmission mode. The power control apparatus is an upper-level node of the first node or a donor base station.

In a possible implementation, the second message is further used to request second receive power expected by the first node in a second transmission mode.

In another possible implementation, the second message is a receive power request message. The receive power request message includes a first offset value and/or a power scaling factor. The first offset value is an offset value relative to receive power or transmit power of any one or more of a demodulation reference signal, a synchronization signal/physical broadcasting channel, and a channel state information reference signal. The power scaling factor is multiplied by the receive power or the transmit power of any one of the demodulation reference signal, the synchronization signal/physical broadcasting channel, and the channel state information reference signal, to obtain the first receive power.

In another possible implementation, the second message is a receive power adjustment request message. The receive power adjustment request message carries fourth indication information. The fourth indication information is used to indicate to trigger the power control apparatus to adjust third transmit power. The third transmit power is transmit power used when the power control apparatus performs transmission to the first node in the first transmission mode. Alternatively, the fourth indication information is used to indicate the power control apparatus to increase or decrease third transmit power.

In another possible implementation, the second message is a receive power adjustment request message. The receive power adjustment request message carries a first adjustment value. The first adjustment value is used by the power control apparatus to adjust third transmit power. The third transmit power is transmit power used when the power control apparatus performs transmission to the first node in the first transmission mode. Alternatively, the receive power adjustment request message carries a first bit, and the first bit corresponds to the first adjustment value.

In another possible implementation, the receive power adjustment request message is carried in a MAC CE, UCI, or RRC signaling.

In another possible implementation, the transceiver module 801 is further configured to send first acknowledgment information to the first node, where the first acknowledgment information is used to notify the first node that the power control apparatus has received the second message.

Figure 9:
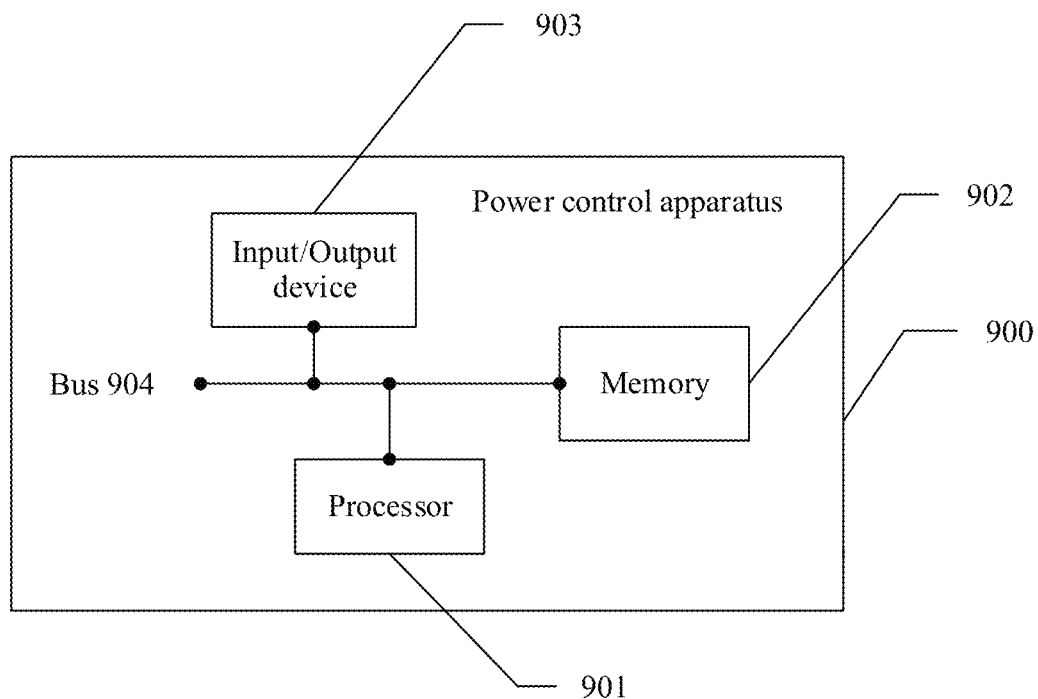
FIG. 9 is a schematic diagram of another structure of a power control apparatus according to an embodiment of this application.

This application further provides a power control apparatus 900. FIG. 9 is a schematic diagram of another structure of a power control apparatus according to an embodiment of this application. The power control apparatus may be a first node. The power control apparatus may be configured to perform a step performed by the first node in the embodiment shown in FIG. 3A. Refer to related descriptions in the foregoing method embodiment.

The power control apparatus 900 includes a processor 901, a memory 902, an input/output device 903, and a bus 904.

In a possible implementation, the processor 901, the memory 902, and the input/output device 903 are separately connected to the bus 904, and the memory stores computer instructions.

The processing module 501 in the foregoing embodiment may be specifically the processor 901 in this embodiment. Therefore, a specific implementation of the processor 901 is not described again. The transceiver module 502 in the foregoing embodiment may be specifically the input/output device 903 in this embodiment.

Figure 10:
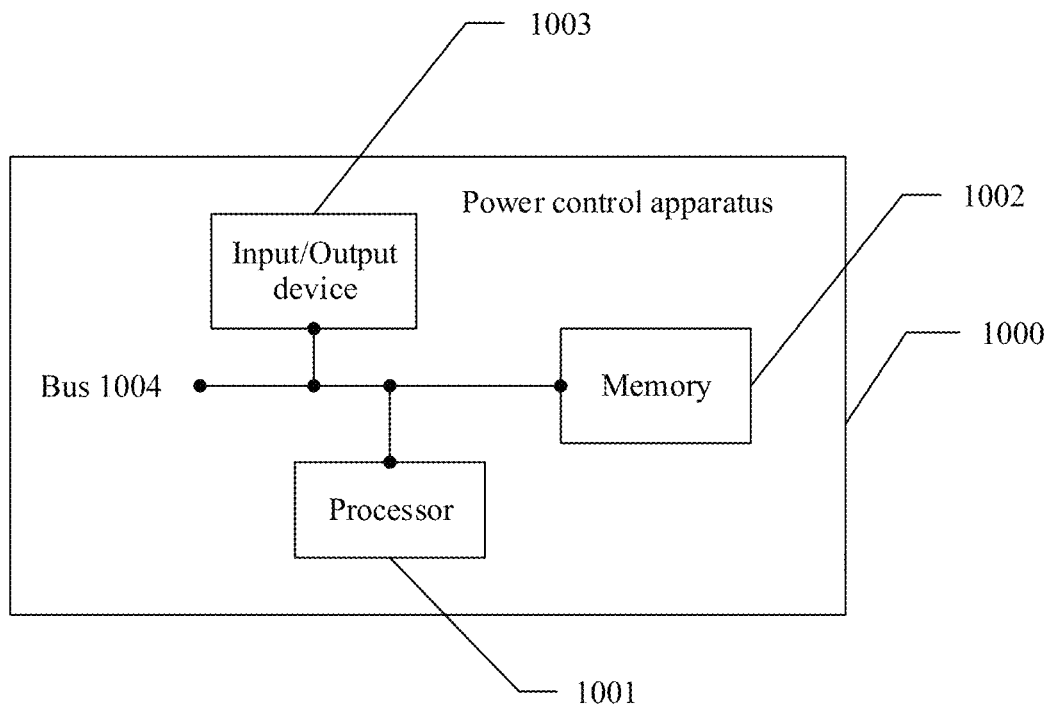
FIG. 10 is a schematic diagram of another structure of a power control apparatus according to an embodiment of this application.

This application further provides a power control apparatus 1000. FIG. 10 is a schematic diagram of another structure of a power control apparatus according to an embodiment of this application. The power control apparatus may be a second node. The power control apparatus may be configured to perform a step performed by the second node in the embodiment shown in FIG. 3A. Refer to related descriptions in the foregoing method embodiment.

The power control apparatus 1000 includes a processor 1001, a memory 1002, an input/output device 1003, and a bus 1004.

In a possible implementation, the processor 1001, the memory 1002, and the input/output device 1003 are separately connected to the bus 1004, and the memory stores computer instructions.

The transceiver module 601 in the foregoing embodiment may be specifically the input/output device 1003 in this embodiment.

Figure 11:
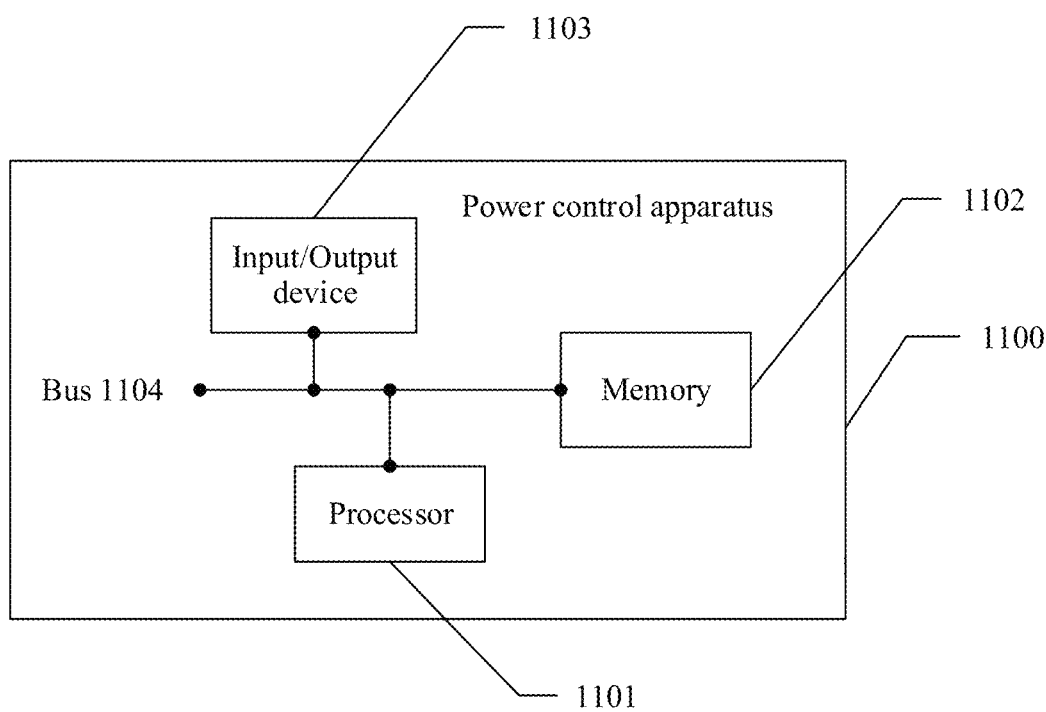
FIG. 11 is a schematic diagram of another structure of a power control apparatus according to an embodiment of this application.

This application further provides a power control apparatus 1100. FIG. 11 is a schematic diagram of another structure of a power control apparatus according to an embodiment of this application. The power control apparatus may be a first node. The power control apparatus may be configured to perform a step performed by the first node in the embodiment shown in FIG. 4. Refer to related descriptions in the foregoing method embodiment.

The power control apparatus 1100 includes a processor 1101, a memory 1102, an input/output device 1103, and a bus 1104.

In a possible implementation, the processor 1101, the memory 1102, and the input/output device 1103 are separately connected to the bus 1104, and the memory stores computer instructions.

The processing module 702 in the foregoing embodiment may be specifically the processor 1101 in this embodiment. Therefore, a specific implementation of the processor 1101 is not described again. The transceiver module 701 in the foregoing embodiment may be specifically the input/output device 1103 in this embodiment.

Figure 12:
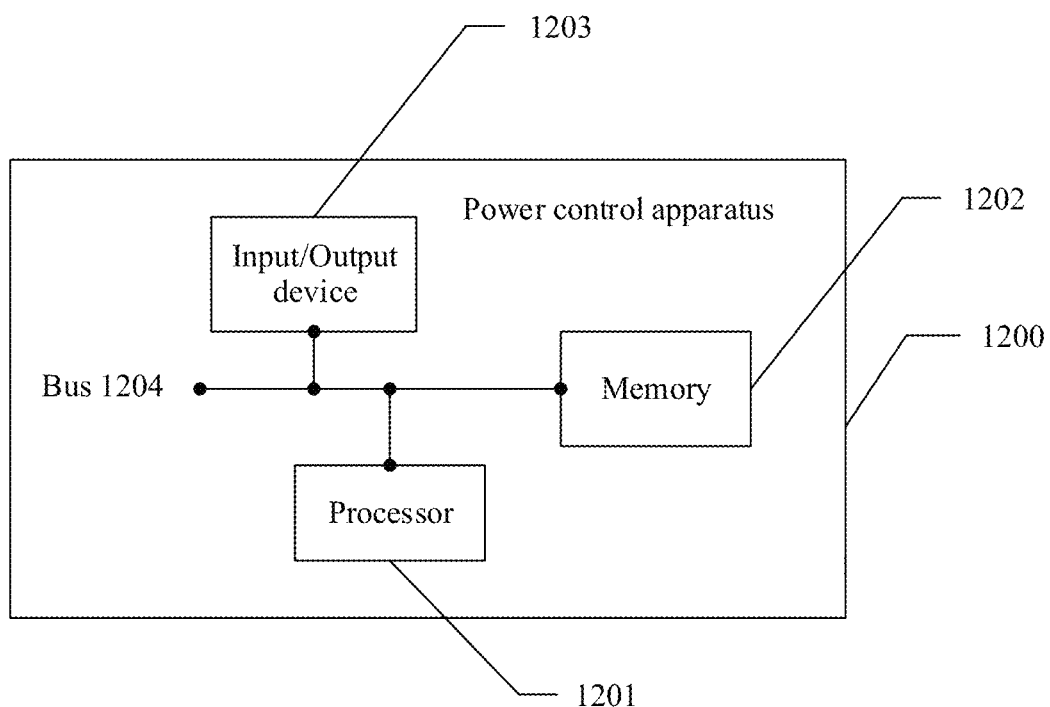
FIG. 12 is a schematic diagram of another structure of a power control apparatus according to an embodiment of this application.

This application further provides a power control apparatus 1200. FIG. 12 is a schematic diagram of another structure of a power control apparatus according to an embodiment of this application. The power control apparatus may be a second node. The power control apparatus may be configured to perform a step performed by the second node in the embodiment shown in FIG. 4. Refer to related descriptions in the foregoing method embodiment.

The power control apparatus 1200 includes a processor 1201, a memory 1202, an input/output device 1203, and a bus 1204.

In a possible implementation, the processor 1201, the memory 1202, and the input/output device 1203 are separately connected to the bus 1204, and the memory stores computer instructions.

The transceiver module 801 in the foregoing embodiment may be specifically the input/output device 1203 in this embodiment. Therefore, a specific implementation of the input/output device 1203 is not described again.

Figure 13:
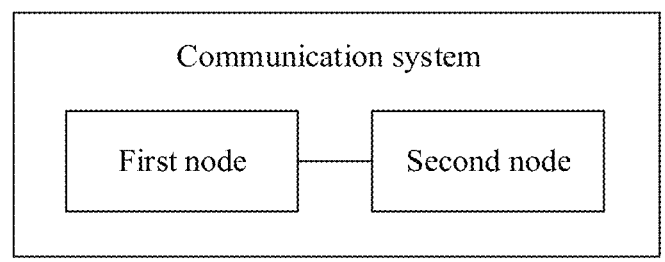
FIG. 13 is a schematic diagram of a communication system according to an embodiment of this application.

As shown in FIG. 13, an embodiment of this application further provides a communication system. The communication system includes a power control apparatus. Specifically, the power control apparatus may include the power control apparatus shown in FIG. 5 and the power control apparatus shown in FIG. 6. The power control apparatus shown in FIG. 5 is configured to perform all or some of the steps performed by the first node in the embodiment shown in FIG. 3A, and the power control apparatus shown in FIG. 6 is configured to perform all or some of the steps performed by the second node in the embodiment shown in FIG. 3A. Alternatively, the power control apparatus may include the power control apparatus shown in FIG. 7 and the power control apparatus shown in FIG. 8. The power control apparatus shown in FIG. 7 is configured to perform all or some of the steps performed by the first node in the embodiment shown in FIG. 4, and the power control apparatus shown in FIG. 8 is configured to perform all or some of the steps performed by the second node in the embodiment shown in FIG. 4.

An embodiment of this application further provides a computer program product including instructions. When the computer program product runs on a computer, the computer is enabled to perform the power control methods in the embodiments shown in FIG. 3A and FIG. 4.

An embodiment of this application further provides a computer-readable storage medium, including instructions. When the instructions are run on a computer, the computer is enabled to perform the power control methods in the embodiments shown in FIG. 3A and FIG. 4.

In another possible design, when the power control apparatus is a chip in a terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the power control methods in the embodiments shown in FIG. 3A and FIG. 4. Optionally, the storage unit is a storage unit in the chip, for example, a register or a cache. Alternatively, the storage unit may be a storage unit that is in the terminal and that is located outside the chip, for example, a read-only memory (read-only memory, ROM), another type of static storage device that can store static information and instructions, or a random access memory (random access memory, RAM).

The processor mentioned anywhere above may be a general-purpose central processing unit, a microprocessor, an application-specific integrated circuit (application-specific integrated circuit, ASIC), or one or more integrated circuits configured to control program execution of the power control methods in the embodiments shown in FIG. 3A and FIG. 4.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the foregoing described apparatus embodiments are merely examples. For example, division into the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate, and components displayed as units may or may not be physical units. To be specific, the components may be located at one location, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The foregoing integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes a plurality of instructions for instructing a computer device (which may be, for example, a personal computer, a server, or a network device) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a floppy disk, or a compact disc.

The foregoing embodiments are merely intended to describe the technical solutions of this application, but are not intended to limit this application. Although this application is described in detail with reference to the foregoing embodiments, a person of ordinary skill in the art should understand that the technical solutions described in the foregoing embodiments may still be modified or some technical features thereof may be equivalently replaced. These modifications or replacements do not enable essence of a corresponding technical solution to depart from the spirit and scope of the technical solutions of embodiments of this application.

The invention claimed is:

1. A power control apparatus, wherein the power control apparatus comprises:
    a processor, configured to determine a first power control parameter, wherein the first power control parameter indicates a first transmit power expected by the power control apparatus in a first transmission mode; and
    a transceiver, configured to send a first message to a second node, wherein the first message carries the first power control parameter, the first message requests the first transmit power expected by the power control apparatus in the first transmission mode, and the second node is an upper-level node of the power control apparatus or a donor base station.

2. The power control apparatus according to claim 1, wherein the first message further carries a second power control parameter, and the second power control parameter indicates a second transmit power expected by the power control apparatus in a second transmission mode.

3. The power control apparatus according to claim 1, wherein the first power control parameter is further indicates the second transmit power expected by the power control apparatus in a second transmission mode.

4. The power control apparatus according to claim 1, wherein the first power control parameter comprises:
    a value related to a reference power, a subscriber-level nominal power, or a reference power offset.

5. The power control apparatus according to claim 4, wherein the value of the subscriber-level nominal power is represented by an uplink shared channel-reference power and path loss parameter set index P0-PUSCH-AlphaSetID.

6. The power control apparatus according to claim 4, wherein the first power control parameter further comprises:
    a path loss compensation factor and/or a path loss measurement reference signal index.

7. The power control apparatus according to claim 6, wherein the path loss compensation factor is represented by the P0-PUSCH-AlphaSetID, and the path loss measurement reference signal index is represented by an uplink shared channel-path loss reference signal PUSCH-PathlossReferenceRS configuration.

8. The power control apparatus according to claim 1, wherein the first message further carries first indication information, and the first indication information indicates a transmission mode corresponding to the first power control parameter.

9. A power control apparatus, wherein the power control apparatus comprises:
    a transceiver, configured to receive a first message sent by a first node, wherein the first message carries a first power control parameter, the first power control parameter indicates a first transmit power expected by the first node in a first transmission mode, the first message requests the first transmit power expected by the first node in the first transmission mode, and the power control apparatus is an upper-level node of the first node or a donor base station.

10. The power control apparatus according to claim 9, wherein the first message further carries a second power control parameter, and the second power control parameter indicates a second transmit power expected by the first node in a second transmission mode.

11. The power control apparatus according to claim 9, wherein the first power control parameter is further indicates the second transmit power expected by the first node in a second transmission mode.

12. The power control apparatus according to claim 9, wherein the first power control parameter comprises:
 a value related to a reference power, a subscriber-level nominal power, or a reference power offset.

13. The power control apparatus according to claim 12, wherein the value of the subscriber-level nominal power is represented by an uplink shared channel-reference power and path loss parameter set index P0-PUSCH-AlphaSetID.

14. The power control apparatus according to claim 12, wherein the first power control parameter further comprises:
 a path loss compensation factor and/or a path loss measurement reference signal index.

15. The power control apparatus according to claim 14, wherein the path loss compensation factor is represented by the P0-PUSCH-AlphaSetID, and the path loss measurement reference signal index is represented by an uplink shared channel-path loss reference signal PUSCH-PathlossReferenceRS configuration.

16. The power control apparatus according to claim 9, wherein the first message further carries first indication information, and the first indication information is used to indicate a transmission mode corresponding to the first power control parameter; or an information element name of the first message is used to indicate a transmission mode corresponding to the first power control parameter.

17. A power control method, wherein the method comprises:
 determining, by a first node, a first power control parameter, wherein the first power control parameter indicates first transmit power expected by the first node in a first transmission mode; and
 sending, by the first node, a first message to a second node, wherein the first message carries the first power control parameter, the first message requests the first transmit power expected by the first node in the first transmission mode, and the second node is an upper-level node of the first node or a donor base station.

* * * * *